(12) United States Patent
Balasubramanian et al.

(10) Patent No.: US 11,805,067 B1
(45) Date of Patent: Oct. 31, 2023

(54) DYNAMICALLY GENERATING AND MANAGING REQUEST QUEUES FOR PROCESSING ELECTRONIC REQUESTS VIA A SHARED PROCESSING INFRASTRUCTURE

(71) Applicant: OneTrust LLC, Atlanta, GA (US)

(72) Inventors: Anand Balasubramanian, Bangalore (IN); Shamshuddin Sayyed, Bangalore (IN); Rajeev Tiwari, Bangalore (IN); Sunil Tayi, Acworth, GA (US); Matthew Hennig, Atlanta, GA (US)

(73) Assignee: OneTrust LLC, Atlanta, GA (US)

( * ) Notice: Subject to any disclaimer, the term of this patent is extended or adjusted under 35 U.S.C. 154(b) by 23 days.

(21) Appl. No.: 17/662,709

(22) Filed: May 10, 2022

(51) Int. Cl.
*H04L 47/62* (2022.01)
*H04L 67/1031* (2022.01)
*H04L 47/52* (2022.01)
*H04L 47/60* (2022.01)

(52) U.S. Cl.
CPC ........ *H04L 47/6225* (2013.01); *H04L 47/521* (2013.01); *H04L 47/60* (2013.01); *H04L 67/1031* (2013.01)

(58) Field of Classification Search
CPC ... H04L 47/6225; H04L 47/521; H04L 47/60; H04L 67/1031
See application file for complete search history.

(56) References Cited

U.S. PATENT DOCUMENTS

| | | | |
|---|---|---|---|
| 10,656,966 B1 * | 5/2020 | Grubin | G06F 9/5033 |
| 2015/0058484 A1 * | 2/2015 | Mehta | G06F 9/5072 709/225 |
| 2015/0150016 A1 * | 5/2015 | Kim | G06F 9/5038 718/103 |
| 2017/0061364 A1 * | 3/2017 | Waltz | G06F 16/2453 |
| 2019/0149478 A1 * | 5/2019 | McHugh | H04L 67/10 709/226 |
| 2019/0310890 A1 * | 10/2019 | Kancharla | G06F 9/4887 |
| 2020/0210164 A1 * | 7/2020 | Mathur | G06F 8/65 |
| 2022/0078248 A1 * | 3/2022 | Upton | H04L 67/63 |

* cited by examiner

*Primary Examiner* — Yaotang Wang
(74) *Attorney, Agent, or Firm* — Keller Preece PLLC

(57) ABSTRACT

Methods, systems, and non-transitory computer readable storage media are disclosed for utilizing dynamic request queues to process electronic requests in a shared infrastructure environment. The disclosed system dynamically generates a plurality of separate request queues for tenant computing systems that utilize a shared processing infrastructure to issue electronic requests for processing by various recipient processors (e.g., one or more processing threads) by separating a primary request queue into the separate requests queues based on the tenant computing systems. The disclosed system also generates a plurality of queue order scores for the request queues based in part on a processing recency of each of the request queues and whether the request queues have pending electronic requests. The disclosed system processes electronic requests in the request queues by selecting a request queue based on the queue order scores and processing a batch of electronic requests utilizing a recipient processor.

20 Claims, 13 Drawing Sheets

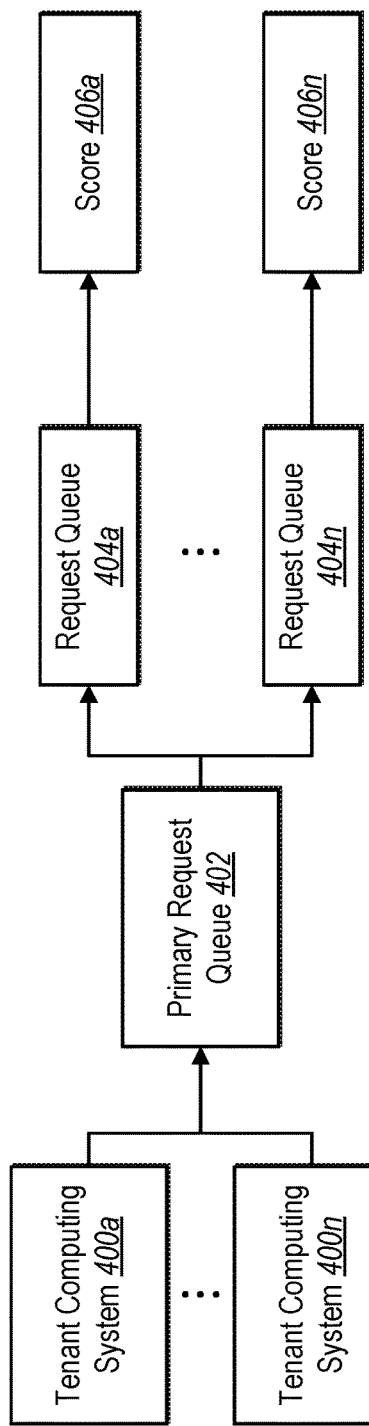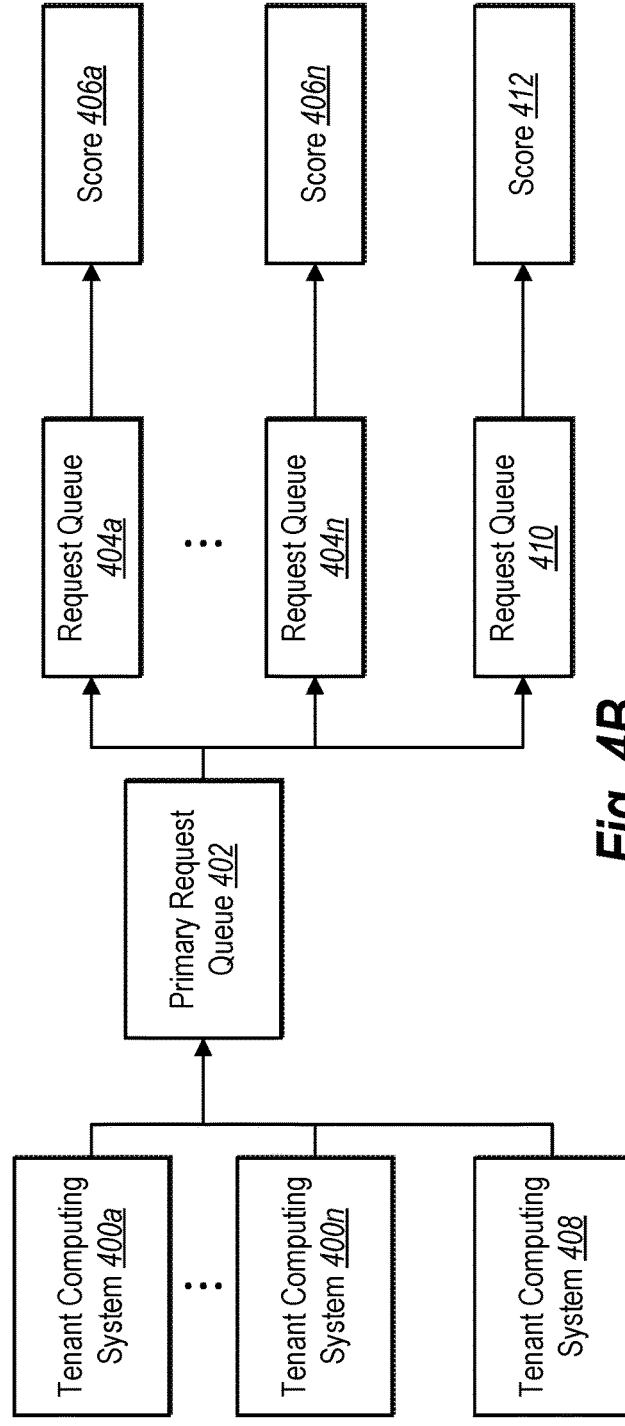

DYNAMICALLY GENERATING AND MANAGING REQUEST QUEUES FOR PROCESSING ELECTRONIC REQUESTS VIA A SHARED PROCESSING INFRASTRUCTURE

BACKGROUND

Many entities provide or utilize services that involve many devices communicating over a network to make requests for performing various processes in connection with the services. For example, entities that provide network security services or network privacy services to other entities via network requests can be in communication with computing devices to process electronic requests (e.g., messages or other events) associated with the services. Handling many such requests from various computing systems—sometimes thousands or hundreds of thousands of requests—can require a significant amount of computer processing power and time utilizing a finite amount of processing power. Furthermore, when certain computing systems provide a significantly greater number of requests to an entity than other computing systems, processing the requests from the various computing systems in an efficient and timely manner can be a challenging process. Conventional systems typically leverage processes that fail to fairly and efficiently allocate computing resources for processing requests from different computing systems due to the greatly varying needs of each computing system.

SUMMARY

This disclosure describes one or more embodiments of methods, non-transitory computer readable media, and systems that solve one or more of the foregoing problems (in addition to providing other benefits) by utilizing dynamic request queues to process electronic requests in a shared infrastructure environment. Specifically, the disclosed systems dynamically generate a plurality of separate request queues for tenant computing systems that utilize a shared processing infrastructure to issue electronic requests for processing by various recipient processors (e.g., one or more processing threads) by separating a primary request queue into the separate requests queues based on the tenant computing systems. The disclosed systems also generate a plurality of queue order scores for the request queues based in part on a processing recency of each of the request queues and whether the request queues have pending electronic requests. The disclosed systems process electronic requests in the request queues by selecting a request queue based on the queue order scores and processing a batch of electronic requests utilizing a recipient processor. The disclosed systems thus utilize dynamic request queues to leverage the shared processing infrastructure for fairly and efficiently processing electronic requests across a number of different tenant computing systems.

BRIEF DESCRIPTION OF THE DRAWINGS

Various embodiments will be described and explained with additional specificity and detail through the use of the accompanying drawings

FIGS. 4A-4B illustrate an example of the dynamic request queue system dynamically generating a request queue for tenant computing systems in accordance with one or more implementations.

DETAILED DESCRIPTION

Figure 1:
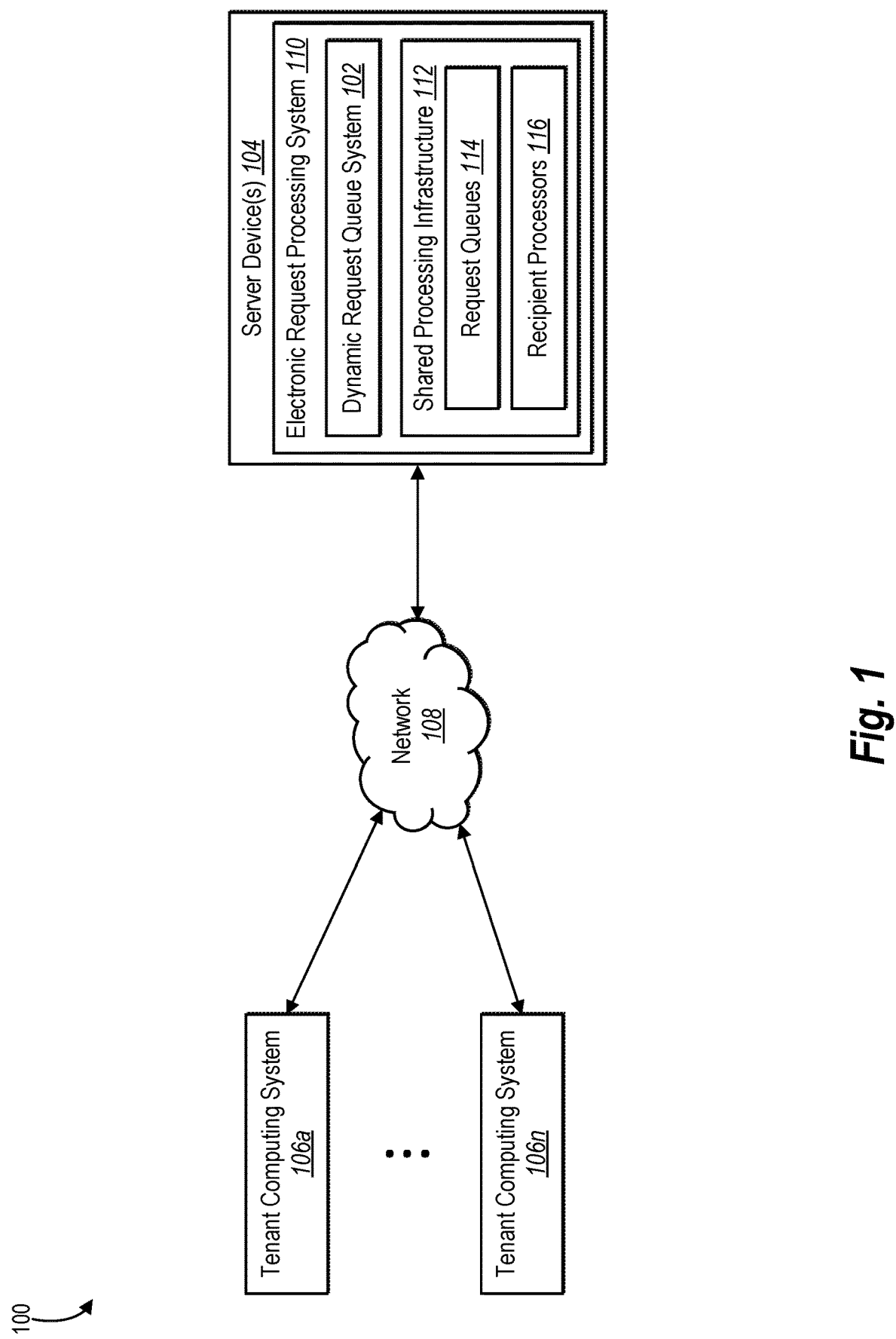
FIG. 1 illustrates an example of a system environment in which a dynamic request queue system can operate in accordance with one or more implementations.

This disclosure describes one or more embodiments of a dynamic request queue system that dynamically generates request queues for processing electronic requests in a shared processing infrastructure. In one or more embodiments, the dynamic request queue system generates a plurality of request queues based on a number of different tenant computing systems that provide electronic requests for processing via a shared processing infrastructure. The dynamic request queue system generates queue order scores for the request queues based on a processing recency of each of the request queues and whether each request queue includes pending electronic requests. Furthermore, the dynamic request queue system selects a request queue based on the queue order scores and processes electronic requests in the selected request queue utilizing a recipient processor.

As mentioned, in one or more embodiments, the dynamic request queue system generates a plurality of request queues for a plurality of tenant computing systems. In particular, the dynamic request queue system determines a plurality of tenant computing systems that provide electronic requests to an electronic request processing system via a shared processing infrastructure. For instance, the dynamic request queue system determines a plurality of tenant computing systems that have contributed electronic requests to a primary request queue of the shared processing infrastructure.

In response to determining a plurality of tenant computing systems, the dynamic request queue system generates a plurality of request queues based on the tenant computing systems. For example, the dynamic request queue system generates a separate request queue for each of the tenant computing systems. More specifically, the dynamic request queue system separates the primary request queue of the shared processing infrastructure into the plurality of request queues and moves corresponding electronic requests into the separate request queues. In additional embodiments, the dynamic request queue system generates additional request queues based on request types to further organize a plurality of electronic requests.

In one or more embodiments, the dynamic request queue system generates queue order scores for the request queues. In particular, the dynamic request queue system generates queue order scores for request queues based in part on the processing recency of the request queues. In additional embodiments, the dynamic request queue system also determines whether each request queue has any pending electronic requests from the primary request queue. The dynamic request queue system thus ranks the request queues based on the queue order scores to select a particular request queue from which to process electronic requests.

According to one or more additional embodiments, the dynamic request queue system processes electronic requests in the plurality of request queues according to the queue order scores. Specifically, the dynamic request queue system can select a request queue from the ranked request queues from which to process one or more electronic requests. For instance, the dynamic request queue system selects a request queue with the lowest queue order score and process a batch of electronic requests in the selected request queue via a particular recipient processor (e.g., a processing thread). The dynamic request queue system can process electronic messages in the plurality of request queues according to the queue order scores while periodically updating the queue order scores to maintain efficient and fair use of the shared processing infrastructure across a plurality of tenant computing systems.

As mentioned, conventional systems have a number of shortcomings in relation to processing electronic requests in a multi-tenant environment. For example, many conventional systems inefficiently process electronic requests for a plurality of tenant computing systems. Specifically, some entities utilize a processing infrastructure that processes electronic requests from a plurality of tenant computing systems within a single request queue. While these conventional systems provide multi-tenant processing of electronic requests, processing electronic requests from more than one tenant computing system via a single request queue can result in significant delays in processing electronic requests for various tenant computing systems. For example, if one or more tenant computing systems push large quantities of electronic requests into the shared processing infrastructure, the conventional systems inefficiently process electronic requests from other tenant computing systems by causing significant processing delays for the other tenant computing systems.

Some conventional systems attempt to overcome some inefficiencies of traditional processing systems by introducing multiple partitions into the processing infrastructure. For instance, some conventional systems create and manage different partitions for different request types such as bulk requests and non-bulk requests. By leveraging a plurality of partitions to process electronic requests, the conventional systems are able to improve the processing infrastructure by moving different request types to different nodes in a processing cluster. Utilizing a plurality of partitions in a processing system, however, can introduce additional inefficiencies due to the time and effort that multiple partitions require. To illustrate, managing multiple partitions in a request processing system typically requires manual user/administrator intervention to manage the different nodes. Accordingly, such conventional systems lack flexibility and scalability.

Additionally, managing separate partitions requires the use of different nodes in a cluster, thereby increasing the complexity of the processing infrastructure without addressing the issue of high volume tenant computing systems or other spike loads. Conventional systems that split a processing infrastructure into a plurality of partitions introduce additional complexity while also potentially failing to account for overloading of an individual partition. More specifically, by failing to account for high volume tenant computing systems within a particular partition, other tenant computing systems within the same partition may still be required to wait significant amounts of time for the processing infrastructure to process their requests.

The disclosed dynamic request queue system provides a number of advantages over conventional systems. For example, the dynamic request queue system provides improved efficiency for computing systems that manage a shared processing infrastructure in a multi-tenant environment. In particular, in contrast to conventional systems that inefficiently utilize a single request queue to process electronic messages from a plurality of tenant computing systems, the dynamic request queue system dynamically generates request queues for a plurality of tenant computing systems to selectively process electronic requests utilizing recipient processors. To illustrate, by separating a primary request queue including electronic requests from a plurality of tenant computing systems into a plurality of tenant-specific request queues, the dynamic request queue system can reduce wait times and queue loads for many tenant computing systems by selecting specific queues after each batch of requests. More specifically, the dynamic request queue system ranks the dynamically generated request queues based on attributes such as processing recency and pending requests to select a queue from which to process requests.

Additionally, the dynamic request queue system provides improved flexibility of computing systems that process electronic requests via a shared processing infrastructure in a multi-tenant environment. Specifically, in contrast to conventional systems that utilize Kafka topic processing systems with difficult to manage partitions to handle different request types (e.g., bulk/non-bulk), the dynamic request queue system utilizes dynamic request queues to quickly and easily generate new request queues on-demand for different tenant computing systems and request types or remove request queues on-demand for tenant computing systems that no longer contribute. The dynamic request queue system thus provides a separate queue for each tenant computing system that provides electronic requests via a shared processing infrastructure.

Furthermore, by dynamically generating and ranking request queues for a plurality of tenant computing systems, the dynamic request queue system also improves the flexibility and efficiency of a shared processing infrastructure. In particular, the dynamic request queue system continuously generates/updates scores for determining a processing order of request queues, which allows the dynamic request queue system to select a request queue from which to process electronic requests. The dynamic request queue system thus switch between request queues corresponding to different tenant computing systems in real-time to ensure that no queue is ignored for a significant amount of time.

Turning now to the figures, FIG. 1 includes an embodiment of a system environment 100 in which an dynamic request queue system 102 is implemented. In particular, the system environment 100 includes server device(s) 104, and tenant computing systems 106a-106n in communication via a network 108. Moreover, as shown, the server device(s) 104 include an electronic request processing system 110, which includes the dynamic request queue system 102. As further illustrate in FIG. 1, the electronic request processing system includes a shared processing infrastructure 112, which includes a plurality of request queues 114 and a plurality of recipient processors 116.

As shown in FIG. 1, in one or more implementations, the server device(s) 104 include or host the electronic request processing system 110. Specifically, the electronic request processing system 110 includes, or is part of, one or more systems that process electronic requests from the tenant computing systems 106a-106n. For example, the electronic request processing system 110 provides tools to the tenant computing systems 106a-106n for sending the electronic requests to the electronic request processing system 110 for processing by the recipient processors 116. In one or more embodiments, the electronic request processing system 110 provides an application programming interface ("API") or other interfacing tools that allow the tenant computing systems to issue requests to the shared processing infrastructure 112 for inserting into the plurality of requests queues 114 and processing by the recipient processors 116.

According to some embodiments, the electronic request processing system 110 receives electronic requests from the tenant computing systems 106a-106n for performing various operations associated with security services, privacy services, or other services. To illustrate, the electronic request processing system 110 can receive requests to process consent messages associated with generating digital cookies for providing to client devices via the tenant computing systems 106a-106n. In another example, the electronic request processing system 110 can process electronic requests including data subject access requests to verify personal information that has been collected/stored. For example, the tenant computing systems 106a-106n include server devices associated with entities displaying websites or other content on the client devices. In alternative embodiments, the tenant computing systems 106a-106n include applications (e.g., web browsers) of the client devices that communicate with the electronic request processing system 110 via the network 108 to issue the requests. In additional embodiments, the tenant computing systems 106a-106n include, or correspond to, server-side tenant entities stored at the electronic request processing system 110 based on requests sent to the electronic request processing system 110 from a plurality of devices.

As used herein, an "electronic request" (or simply "request") refers to a communication from a first computing device to a second computing device to perform a computing operation. In one or more embodiments, an electronic request from a tenant computing system (e.g., the tenant computing systems 106a-106n) includes a packet or message sent to the electronic request processing system 110 (e.g., via an API provided by the electronic request processing system 110) and including processing instructions to perform one or more operations via the recipient processors 116. For instance, an electronic request can include an indication of consent for generating a digital cookie for storing and/or analyzing data associated with the consent and/or digital cookie.

As used herein, the term "shared processing infrastructure" refers to a server or a group of servers that processes electronic requests from a plurality of different computing devices or systems. For example, the server or a group of servers can process electronic requests from the plurality of different computing devices or systems via a single initial queue. In particular, a shared processing infrastructure includes a plurality of processing threads for processing instructions from a plurality of tenant computing systems issued via a single combined processing queue (e.g., to a primary server or computing device that accesses or controls the processing threads). For example, the shared processing infrastructure 112 of FIG. 1 can include the server device(s) 104 or a subset of the server device(s). Additionally, the shared processing infrastructure 112 can include a cluster of server devices that includes a log (e.g., a commit log) of requests from the tenant computing system 106a-106n to process, such as by analyzing and/or storing data from the requests or associated with the requests. To illustrate, the shared processing infrastructure 112 includes the recipient processors 116 to process electronic messages of a single request type (e.g., consent messages).

In one or more embodiments, the electronic request processing system 110 utilizes the dynamic request queue system 102 to dynamically generate request queues based on the tenant computing systems 106a-106n. Specifically, the dynamic request queue system 102 dynamically generates a request queue by generating a request queue in real-time and on-demand in response to on one or more requests issued by a tenant computing system for processing via a shared processing infrastructure. Thus, in contrast to conventional systems, the dynamic request queue system 102 can add or remove request queues without requiring manual user/administrator intervention to generate/manage different node partitions. For instance, the dynamic request queue system 102 can generate the request queues 114 within the shared processing infrastructure 112 to provide a separate request queue for each tenant computing system. Accordingly, the dynamic request queue system 102 can generate the request queues 114 to process batches of electronic requests from the tenant computing systems 106a-106n according to ranked priorities of the request queues 114. In additional embodiments, the electronic request processing system 110 communicates with the tenant computing systems 106a-106n to provide indications of processed requests from the tenant computing systems 106a-106n.

In one or more embodiments, the server device(s) 104 include a variety of computing devices, including those described below with reference to FIG. 12. For example, the server device(s) 104 includes one or more servers for storing and processing data associated with electronic requests in a shared processing infrastructure. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the tenant computing systems 106a-106n. In one or more embodiments, the tenant computing systems 106a-106n include, but are not limited to, server devices, server clusters, or individual client devices in communication with the electronic request processing system 110. For example, each tenant computing system can include a mobile device (e.g., smartphone or tablet), a laptop, a desktop, including those explained below with reference to FIG. 12 or one or more applications or components operating thereon. Furthermore, although not shown in FIG. 1, the tenant computing systems 106a-106n can be operated by users (e.g., a user included in, or associated with, the system environment 100) to perform a variety of functions. In particular, the tenant computing systems 106a-106n performs functions such as, but not limited to, sending electronic requests to the electronic request processing system 110 for processing via the shared processing infrastructure 112. For example, the tenant computing systems 106a-106n communicate with the server device(s) 104 via the network 108 to provide electronic requests associated with website requests or other application requests at client devices in connection with privacy/security services provided by or in connection with the electronic request processing system 110.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the tenant computing systems 106a-106n communicate via the network using one or more communication platforms and technologies suitable for transporting data and/or communication signals, including any known communication technologies, devices, media, and protocols supportive of data communications, examples of which are described with reference to FIG. 12.

Although FIG. 1 illustrates the server device(s) 104 and the tenant computing systems 106a-106n communicating via the network 108, in alternative embodiments, the various components of the system environment 100 communicate and/or interact via other methods (e.g., the server device(s) 104 and the tenant computing systems 106a-106n can communicate directly). Furthermore, although FIG. 1 illustrates the dynamic request queue system 102 being implemented by a particular component and/or device within the system environment 100, the dynamic request queue system 102 and/or the electronic request processing system 110 can be implemented, in whole or in part, by other computing devices and/or components in the system environment 100 (e.g., a separate server device or system associated with the electronic request processing system 110).

Figure 2:
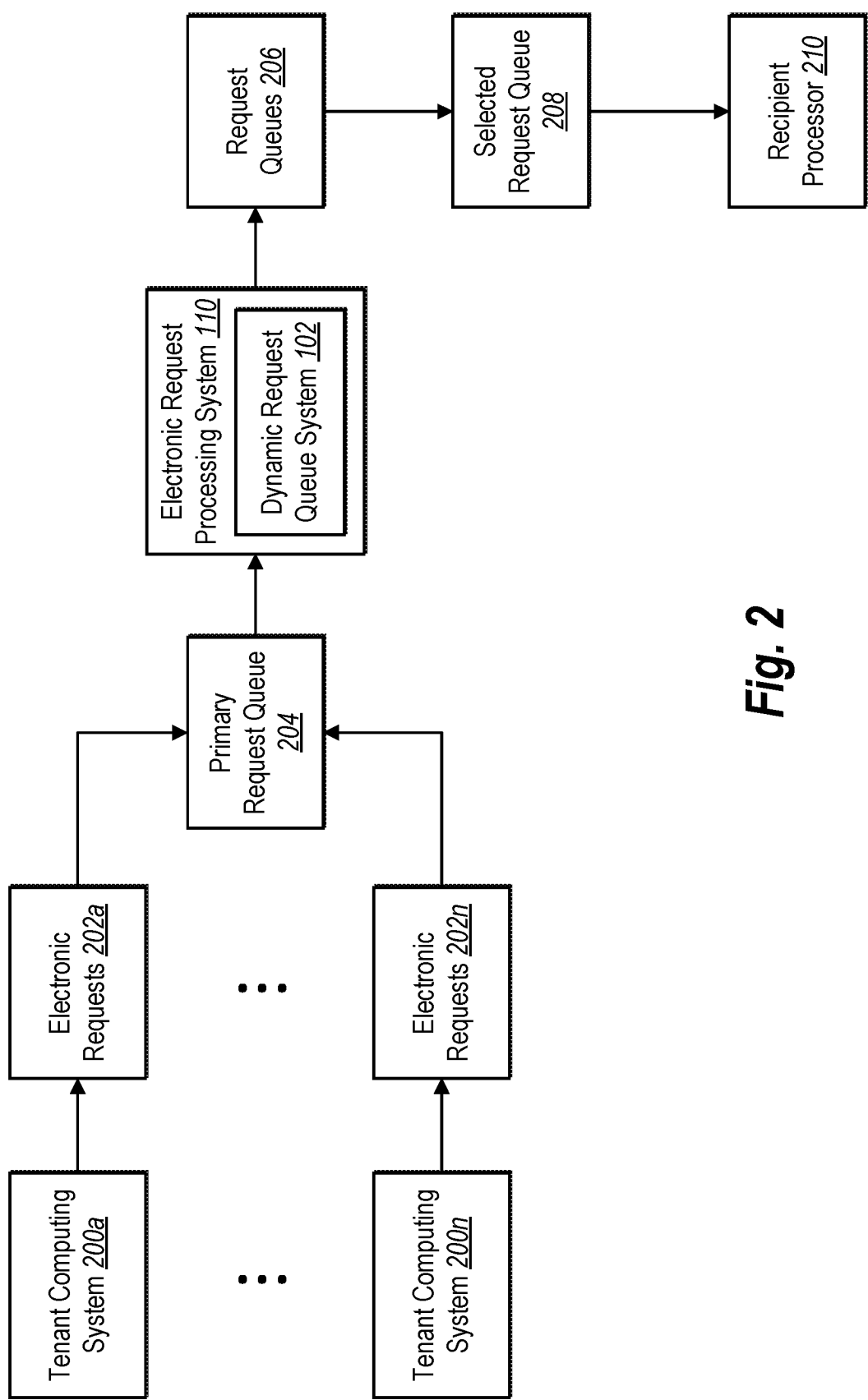
FIG. 2 illustrates an example of an overview of the dynamic request queue system processing electronic requests via tenant-specific request queues in accordance with one or more implementation.

As mentioned, the dynamic request queue system 102 dynamically generates request queues for processing electronic requests in a multi-tenant environment. Specifically, as used herein, a "multi-tenant environment" refers to a computing environment in which a plurality of computing systems or computing devices submit requests to process electronic requests to a shared processing infrastructure. For example, a multi-tenant environment includes a plurality of computing devices associated with one or more entities (e.g., internal systems or third-party systems) sending processing requests to an electronic request processing system that includes a shared processing infrastructure. FIG. 2 illustrates the dynamic request queue system 102 separating electronic requests from a plurality of tenant computing systems into a plurality of request queues of a shared processing infrastructure. Additionally, FIG. 2 illustrates the dynamic request queue system 102 selecting a request queue and processing electronic requests via a recipient processor.

Figure 3A:
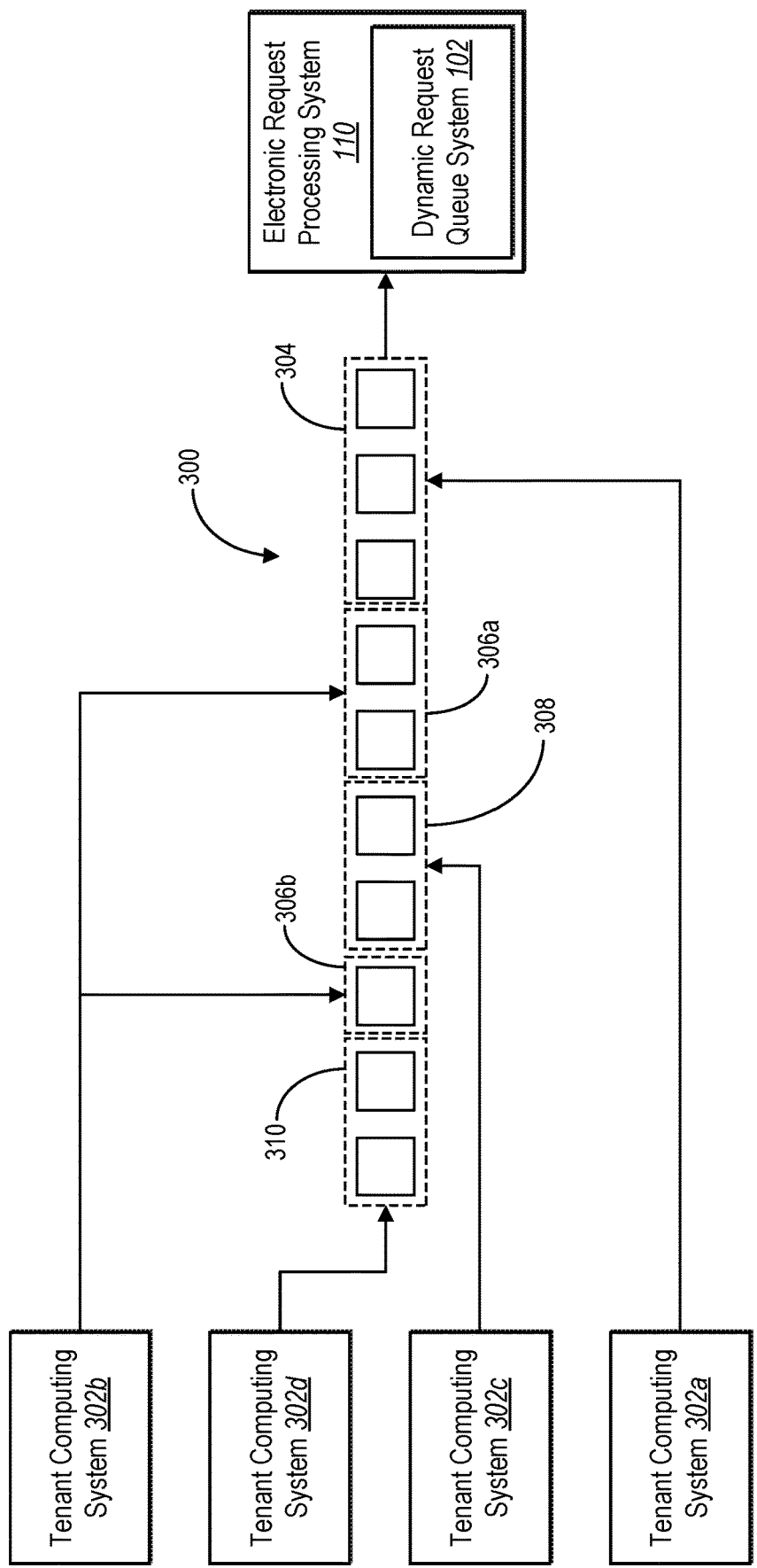
FIG. 3A illustrates an example of a plurality of tenant computing systems providing electronic requests to the dynamic request queue system via a primary request queue in accordance with one or more implementations.

In one or more embodiments, FIG. 2 illustrates that a plurality of tenant computing systems 200a-200n provide a plurality of electronic requests 202a-202n to a primary request queue 204 of a shared processing infrastructure. For example, as previously indicated, the tenant computing systems 200a-200n provide the electronic requests 202a-202n in connection with services such as consent processing for digital cookies or data subject access requests for verification of information usage/storage or other actions associated with the information. FIG. 3A and the corresponding description provide additional detail associated with a plurality of tenant computing systems providing electronic requests to a primary request queue.

Figure 3B:
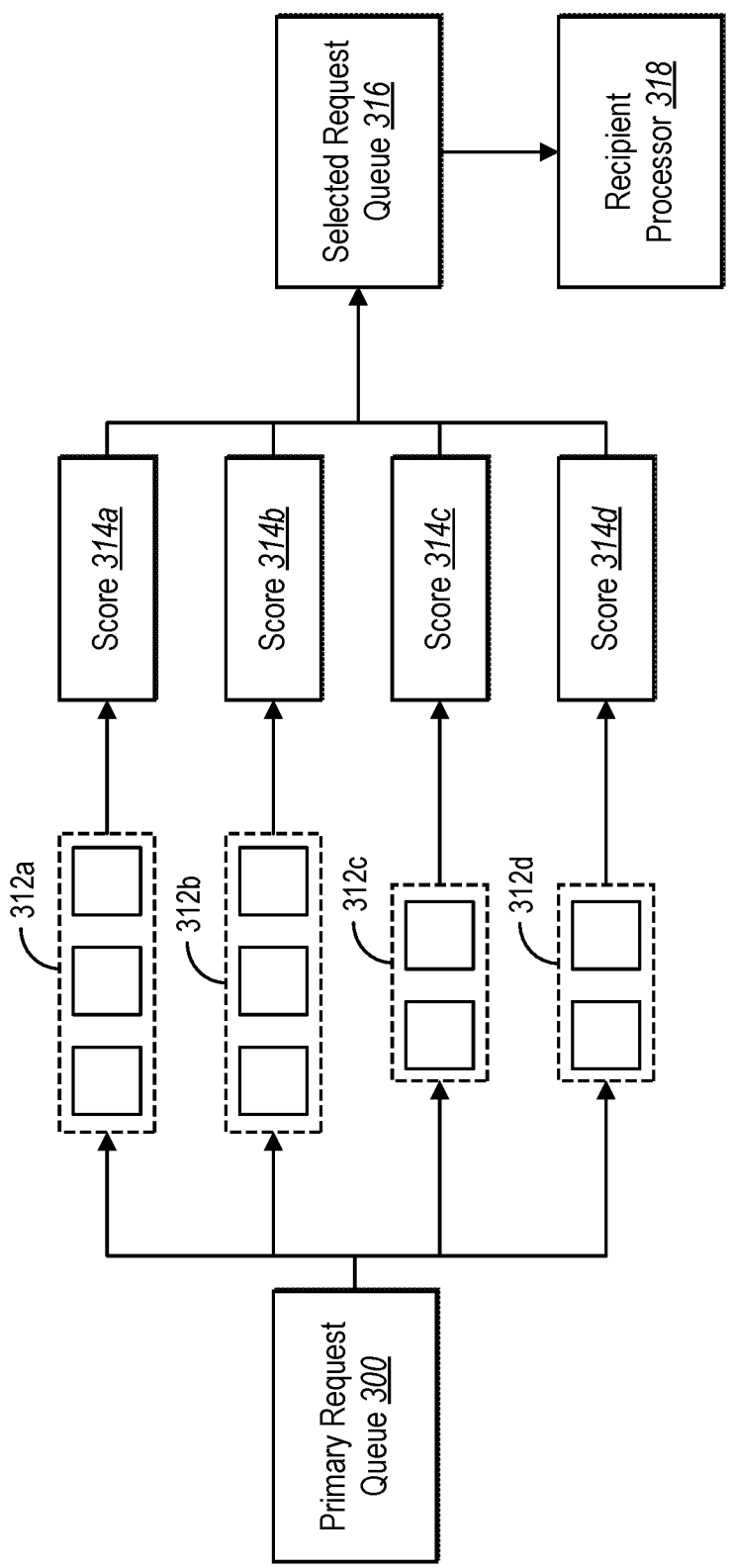
FIG. 3B illustrates an example of the dynamic request queue system scoring and processing electronic requests from the primary request queue of FIG. 3A in separate request queues in accordance with one or more implementations.

Additionally, FIG. 2 illustrates that the electronic request processing system 110 utilizes the dynamic request queue system 102 to separate the primary request queue 204 into a plurality of request queues 206. Specifically, the dynamic request queue system 102 separates the electronic requests 202a-202n from the primary request queue 204 into the request queues 206 according to the tenant computing systems 200a-200n. FIG. 2 further illustrates that the dynamic request queue system 102 determines a selected request queue 208 from the request queues 206 from which to process one or more electronic requests utilizing a recipient processor 210. FIG. 3B and the corresponding description provide additional detail associated with the dynamic request queue system 102 generating request queues and ranking the request queues for processing one or more electronic requests via a recipient processor.

As mentioned previously, the electronic request processing system 110 can process electronic requests from a plurality of different tenant computing systems utilizing a shared processing infrastructure. When a single tenant computing system issues a high volume of requests, processing all of the requests from the tenant computing system (e.g., based simply on arrival time of the requests) prior to computing electronic requests from other tenant computing systems can lead to significant delay for the other tenant computing systems. Accordingly, by separating the electronic requests into separate request queues and ranking the queues, the dynamic request queue system provides improved control and use of the shared processing infrastructure for multi-tenant environments.

FIG. 3A illustrates the dynamic request queue system 102 receiving a plurality of electronic messages from a primary request queue 300 associated with a shared processing infrastructure. In one or more embodiments, the primary request queue 300 of FIG. 3A is a simplified queue including a log of pending electronic requests from a plurality of tenant computing systems 302a-302d. For instance, FIG. 3A illustrates a first tenant computing system 302a, a second tenant computing system 302b, a third tenant computing system 302c, and a fourth tenant computing system 302d that provide electronic requests to the primary request queue 300.

In various embodiments, the electronic requests include messages or other events corresponding to a specific type of operation. For example, the tenant computing systems 302a-302d issue the electronic requests for the electronic request processing system 110, which includes the dynamic request queue system 102, or another system associated with the electronic request processing system 110 to perform the specific operation(s). To illustrate, as previously mentioned, the primary request queue 300 can correspond to a particular node of servers associated with providing a service to the plurality of tenant computing systems 302a-302d. According to some embodiments, some tenant computing systems can send many electronic requests in quick succession (e.g., tens of thousands or millions of requests) to the electronic request processing system 110 for processing.

To illustrate, the first tenant computing system 302a issues a first request set 304 including a plurality of electronic requests to the electronic request processing system 110. In one or more embodiments, the first tenant computing system 302a issues the first request set 304 to the electronic request processing system 110 in a single batch of requests. Accordingly, the electronic request processing system 110 receives the first request set 304 in a single communication session with the first tenant computing system 302a. In some embodiments, the first tenant computing system 302a sends the first request set 304 on behalf of a plurality of client devices. To illustrate, the first request set 304 includes a plurality of consent messages indicating that users associated with the client devices have consented to the use of digital cookies at one or more websites that communicate with the first tenant computing system 302a.

Additionally, as illustrated in FIG. 3A, the second tenant computing system 302b issues a second request set 306a including a plurality of electronic requests to the electronic request processing system 110. As shown, the second tenant computing system 302b issues the second request set 306a to the electronic request processing system 110 after the first request set 304 from the first tenant computing system 302a. FIG. 3A further illustrates that the second tenant computing system 302b also issues a third request set 306b including an electronic request after issuing the second request set 306a. In one or more embodiments, the second request set 306a and the third request set 306b include consent messages indicating that users associated with additional client devices have consented to the use of digital cookies at one or more additional websites that communicate with the second tenant computing system 302b.

FIG. 3A also illustrates that the third tenant computing system 302c issues a fourth request set 308 including a plurality of electronic requests to the electronic request processing system 110. Additionally, the fourth tenant computing system 302d issues a fifth request set 310 including a plurality of electronic requests to the electronic request processing system 110. The fourth request set 308 and the fifth request set 310 include electronic requests with consent messages for one or more websites that communicate with the third tenant computing system 302c and the fourth tenant computing system 302d, respectively.

In one or more embodiments, the primary request queue 300 is organized according to the order in which the electronic requests are received. To illustrate, the electronic request processing system 110 receives the primary request queue 300 including the first request set 304 in a first position of the primary request queue 300 because the first request set 304 was received first. Additionally, the electronic request processing system 110 receives the primary request queue 300 including the second request set 304 in a second position of the primary request queue 300 because the second request set 306a was received after the first request set 304.

Furthermore, while the second tenant computing system 302b issued the second request set 306a and the third request set 306b, the electronic request processing system 110 received the second request set 306a and the third request set 306b at different times. Additionally, the electronic request processing system 110 received the third request set 306b after the fourth request set 308. Accordingly, the primary request queue 300 includes the fourth request set 308 in a third position after the second request set 306a and the third request set 306b in a fourth position after the fourth request set 308. FIG. 3A illustrates that the primary request queue 300 includes the fifth request set 310 in a fifth position due to receiving the fifth request set 310 after the other request sets.

While FIG. 3A illustrates the primary request queue 300 including a plurality of request sets of electronic requests from a plurality of tenant computing systems involving only a few requests, a typical primary request queue can include many electronic requests. For instance, a primary request queue can include tens of thousands of electronic requests from any number of different tenant computing systems. Similarly, each set of requests that the electronic request processing system 110 receives from one or more tenant computing systems can include any number of requests, such that a request set may include a single electronic request or thousands of electronic requests. Thus, in some examples, corresponding primary request queue can include thousands of electronic requests from a first tenant computing system followed by a small quantity of electronic requests from a second tenant computing system.

In connection with receiving a primary request queue including a plurality of electronic requests, the electronic request processing system 110 utilizes the dynamic request queue system 102 to move the electronic requests from the primary request queue 300 to a plurality of separate request queues. For example, FIG. 3B illustrates the dynamic request queue system 102 separating a primary request queue 402 into a plurality of separate request queues. FIG. 3B also illustrates ranking the request queues (e.g., via individual scores of the request queues) and selecting a request queue from which to process electronic messages based on the ranked request queues.

In one or more embodiments, as illustrated in FIG. 3B, the electronic request processing system 110 utilizes the dynamic request queue system 102 to separate the primary request queue 300 of FIG. 3A into a plurality of request queues 312a-312d. Specifically, the dynamic request queue system 102 dynamically generates the request queues 312a-312d based on the plurality of tenant computing systems 302a-302d. For example, the dynamic request queue system 102 generates a separate request queue for each tenant computing system, such as by creating a tenant entity (e.g., a server-side entity) for a particular tenant computing system and generating a request queue corresponding to the tenant entity. To illustrate, the dynamic request queue system 102 generates a first request queue 312a for the first tenant computing system 302a, a second request queue 312b for the second tenant computing system 302b, a third request queue 312c for the third tenant computing system 302c, and a fourth request queue 312d for the fourth tenant computing system 302d.

As illustrated in FIG. 3B, the dynamic request queue system generates the first request queue 312a including electronic messages provided to the primary request queue 300 from the first tenant computing system 302a. In particular, the dynamic request queue system 102 moves electronic messages corresponding to the first tenant computing system 302a from the primary request queue 300 to the first request queue 312a. To illustrate, the dynamic request queue system 102 moves the electronic messages from the first request set 304 in FIG. 3A to the first request queue 312a. For instance, the dynamic request queue system 102 can determine the tenant computing system corresponding to a particular electronic request based on metadata (e.g., a packet header) associated with each request.

Additionally, the dynamic request queue system 102 can organize the electronic messages within the first request queue 312a based on the order of the electronic messages within the primary request queue 300. For example, the dynamic request queue system 102 can determine a timestamp or other indicator of an order of the electronic messages from the first request set 304 in the primary request queue 300. Accordingly, the dynamic request queue system 102 moves the electronic requests into the first request queue 312a in the same order in which the electronic requests were organized within the primary request queue 300.

FIG. 3B also illustrates that the dynamic request queue system 102 moves electronic messages corresponding to the other tenant computing systems from the primary request queue 300 into the corresponding request queues. Specifically, the dynamic request queue system 102 can move the electronic requests received from the second tenant computing system 302b into the second request queue 312b. As mentioned previously, the second tenant computing system 302b provided a plurality of request sets including electronic requests received by the electronic request processing system 110 at different times (e.g., the second request set 306a and the third request set 306b). Because the separate request sets correspond to the same tenant computing system, the dynamic request queue system 102 can move the electronic requests from the separate request sets into the same request queue (e.g., the second request queue 312b). Additionally, by moving the electronic requests from the primary request queue 300 into separate request queues based on tenant computing system, the electronic requests corresponding to the separate request sets are no longer separated by requests from another tenant computing system (e.g., the fourth request set 308 from the third tenant computing system 302c).

In one or more embodiments, in response to generating the request queues 312a-312d corresponding to the tenant computing systems 302a-302d, the dynamic request queue system 102 also ranks the request queues 312a-312d according to a determined processing priority. For example, the dynamic request queue system 102 determines the processing priority for the request queues 312a-312d by generating queue order scores (e.g., scores 314a-314d) corresponding to the request queues 312a-312d. In particular, the dynamic request queue system 102 generates a first score 314a indicating a processing priority for the first request queue 312a based on one or more attributes of the first request queue 312a.

To illustrate, the dynamic request queue system 102 generates the first score 314a for the first request queue 312a by determining a processing recency of the first request queue 312a. In one or more embodiments, the dynamic request queue system 102 determines the processing recency of the first request queue 312a based on a timestamp of a first electronic request (e.g., the next request for processing) in the first request queue 312a. In additional embodiments, the dynamic request queue system 102 stores metadata for the first request queue 312a indicating a most recent processing operation performed for the first request queue 312a.

In one or more embodiments, the dynamic request queue system 102 generates the first score 314a by converting the processing recency into a value that allows the dynamic request queue system 102 to compare the first score 314a to scores of other request queues. For instance, the dynamic request queue system 102 can utilize a scoring model that determines score values along a scale (e.g., a scale from 1-10 or 1-100). To illustrate, the dynamic request queue system 102 generates the first score 314a by converting a time since the last processing event for the first request queue 312a (e.g., in milliseconds or seconds) into a score value based on the selected range utilizing a normalization value. Alternatively, the dynamic request queue system 102 generates the score for a request queue by storing a time value since the last processing event as the score.

In some embodiments, the dynamic request queue system 102 also applies non-linear weighting values to the processing recency of a request queue. For example, the dynamic request queue system 102 can determine different weighting values for generating score values for request queues at different time thresholds. Alternatively, the dynamic request queue system 102 can utilize an exponential or logarithmic algorithm to convert a time amount to a score value to reduce the weighting for longer time amounts. As an example, the dynamic request queue system 102 applies a first multiplier for a first time value within a first time period (e.g., five seconds ago) to generate a first score and a second multiplier for a second time value within a second time period (e.g., three minutes ago). In such cases, the second multiplier may be lower than the first multiplier to generate lower scores of request queues that have been waiting longer for processing.

In additional embodiments, the dynamic request queue system 102 generates the scores 314a-314d based on whether the request queues include electronic requests. Specifically, the dynamic request queue system 102 can prioritize request queues that contain pending electronic requests. To illustrate, the dynamic request queue system 102 can penalize request queues that do not have pending electronic requests. For example, the dynamic request queue system 102 can increase a multiplier for converting a processing recency time value to a score value for an empty request queue. Alternatively, the dynamic request queue system 102 can determine an initial score value based on a processing recency time value and add an additional score penalty in response to determining that the request queue is empty.

In one or more embodiments, the dynamic request queue system 102 utilizes one or more additional attributes of request queues to generate queue order scores. For example, the dynamic request queue system 102 can generate a queue order score based on attributes including, but not limited to, a number of requests in a request queue, a priority/importance value associated with a request queue, type of requests in a request queue, processing time associated with requests in a request queue, and historical data associated with the request queue. Accordingly, the dynamic request queue system 102 can generate scores based on one or more attributes associated with request queues according to the particular implementation.

As illustrated in FIG. 3B, the dynamic request queue system 102 utilizes the scores 314a-314d to determine a selected request queue 316 from the request queues 302a-302d. In one or more embodiments, the dynamic request queue system 102 determines the selected request queue 316 by selecting the request queue with the lowest score. To illustrate, the dynamic request queue system 102 selects the request queue with the lowest score from with to process one or more electronic messages. For instance, in response to determining that the first score 314a is the lowest score among the scores 314a-314d, the dynamic request queue system 102 selects the first request queue 312a as the selected request queue 316. By selecting the queue with the lowest score, the dynamic request queue system 102 can reduce or eliminate the chance of a request queue with pending messages of being ignored for a significant amount of time relative to other request queues. Alternatively, the dynamic request queue system 102 can utilize a scoring model that prioritizes queues with higher scores, rather than lower scores.

In one or more embodiments, the dynamic request queue system 102 processes one or more electronic messages in the selected request queue 316 utilizing a recipient processor 318. For example, the recipient processor 318 can include a processing thread in one or more processors of the shared processing infrastructure. To illustrate, the recipient processor 318 can include a single processor (or a single portion of a single processor) of a single server that processes a batch of electronic requests from the selected request queue 316. Alternatively, the recipient processor 318 includes a combination of processors or processing threads of one or more servers that processes the batch of electronic requests from the selected request queue 316.

In one or more embodiments, the processed requests include a predetermined number of requests (e.g., a default batch size) in the selected request queue 316. In alternative embodiments, the processed requests include a variable batch size, such as by processing all of the requests in the selected request queue 316. For instance, the dynamic request queue system 102 can process all of the requests in the selected request queue 316 in response to determining that a number of requests in the selected request queue 316 is below a default batch size or that an estimated processing time for the requests in the selected request queue 316 is below a threshold time.

In one or more embodiments, the dynamic request queue system 102 simulates tenant computing systems within a particular environment. For example, a given environment may include many different tenant computing systems providing electronic requests to the electronic request processing system 110. Instead of creating a separate tenant entity for each tenant computing system, the dynamic request queue system 102 can simulate the tenant computing systems for generating the request queues. To illustrate, the dynamic request queue system 102 can obtain data from a request identifier (e.g., a set of bytes at the beginning of an electronic request) to use in creating a pseudo-tenant entity. Accordingly, the dynamic request queue system 102 can determine that additional electronic requests that share the same data in the request identifier correspond to the same pseudo-tenant entity and sort the corresponding electronic requests into the same request queue.

In additional embodiments, the dynamic request queue system 102 generates a plurality of request queues within one or more queue spaces (e.g., separate nodes dedicated to separate request spaces). In particular, the dynamic request queue system 102 generates the request queues 312a-312d within a first request space associated with the tenant computing systems 302a-302d. In additional embodiments, the dynamic request queue system 102 generates one or more additional request queues in a second request space based on a request type associated with the additional request queues. In some embodiments, the dynamic request queue system 102 also generates one or more additional request spaces including one or more request queues for one or more tenant computing systems based on the quantity of electronic requests issued by the one or more tenant computing systems. To illustrate, the dynamic request queue system 102 can move a particular tenant computing system into a separate request space in response to determining that the number of requests by the tenant computing system within the primary request queue 300 exceeds a threshold number of requests. In alternative embodiments, the electronic requests of different types are separated into different queue spaces prior to a primary request queue.

In one or more embodiments, the dynamic request queue system 102 establishes separate request queues for transitioning from a conventional system involving a plurality of separate partitions. For example, the dynamic request queue system 102 can generate a plurality of queues within a queue space to handle certain electronic requests while sending other electronic requests to the conventional partitioned queue(s). The dynamic request queue system 102 can thus begin replacing the conventional partitioned system with request queues by gradually moving electronic requests from separate partitions into the queue space with a plurality of request queues.

In additional embodiments, the dynamic request queue system 102 encrypts electronic requests from tenant computing systems for use in moving requests to the queues. For example, rather than moving the requests themselves to the request queues, the dynamic request queue system 102 can encrypt each request and post a reference to the encrypted request to the corresponding request queue. By posting a reference to an encrypted request queue, rather than the request itself, the dynamic request queue system 102 can save space in the request queue by posting a small reference to the request in the queue. Additionally, this allows the dynamic request queue system 102 to handle a large number of request queues on-demand. In some instances, the dynamic request queue system 102 also performs a periodic purge to clear out older "blobs" (e.g., encrypted request content).

FIGS. 4A-4B illustrate examples of the dynamic request queue system 102 dynamically generating request queues for tenant computing systems. Specifically, FIG. 4A illustrates that the dynamic request queue system 102 generates a set of request queues based on a plurality of tenant computing systems. FIG. 4B illustrates that the dynamic request queue system 102 modifies the set of request queues in response to detecting additional tenant computing systems.

In one or more embodiments, as illustrated in FIG. 4A, a plurality of tenant computing systems 400a-400n contribute to a primary request queue 402 of a shared processing infrastructure. FIG. 4A illustrates that the dynamic request queue system 102 generates a plurality of request queues 404a-404n for the plurality of tenant computing systems 400a-400n. In addition, as shown, the dynamic request queue system 102 generates a plurality of scores 406a-406n for determining a processing priority for the tenant computing systems 400a-400n (e.g., based on the processing recency and/or other attributes of the request queues 404a-404n).

As previously mentioned, the dynamic request queue system 102 can add or remove request queues on-demand based on tenant computing systems contributing to a shared processing infrastructure. FIG. 4B illustrates that the dynamic request queue system 102 integrates an additional tenant computing system 408 contributing to the primary request queue 402. In response to detecting that the additional tenant computing system 408 is providing electronic requests to the primary request queue 402 (e.g., based on messages retrieved from the primary request queue 402), the dynamic request queue system 102 can generate an additional request queue 410 corresponding to the additional tenant computing system 408. Additionally, the dynamic request queue system 102 can move requests corresponding to the additional tenant computing system 408 from the primary request queue 402 to the additional request queue 410.

In additional embodiments, the dynamic request queue system 102 also generates an additional score 412 corresponding to the additional request queue 410. For instance, the dynamic request queue system 102 generates the additional score 412 based on attributes associated with the additional request queue 410. To illustrate, the dynamic request queue system 102 generates the additional score 412 based on a processing recency associated with the additional request queue 410 of the additional tenant computing system 408. In some embodiments, the processing recency of the additional request queue 410 is based on the oldest request in the additional request queue 410. The dynamic request queue system 102 can also generate the additional score 412 based on the additional request queue 410 including electronic requests (e.g., the additional request queue 410 not being empty) or based on the number of electronic requests in the additional queue, etc.

In one or more embodiments, in response to generating the additional score 412 of the additional request queue 410, the dynamic request queue system 102 determines the processing priority of the additional request queue 410. For example, the dynamic request queue system 102 compares the additional score 412 of the additional request queue 410 to the scores 406a-406n of the request queues 404a-404n and inserts the additional request queue 410 into a processing order based on the comparison. To illustrate, in response to determining that the additional score 412 is lower than the scores 404a-404n, the dynamic request queue system 102 inserts the additional request queue 410 into a first processing position for processing one or more electronic requests from the additional request queue 410 prior to processing any other requests.

In additional embodiments, the dynamic request queue system 102 also removes one or more request queues on-demand. Specifically, in response to determining that a particular tenant computing system is not contributing the primary request queue 402, the dynamic request queue system 102 can remove a corresponding request queue from the request queues 404a-404n. For instance, if a particular tenant computing system has not added requests to the primary request queue 402 after a threshold amount of time, the dynamic request queue system 102 can remove a corresponding request queue. By removing the request queue, the dynamic request queue system 102 can save processing resources associated with scoring and ranking the request queue relative to other queues.

Figure 5:
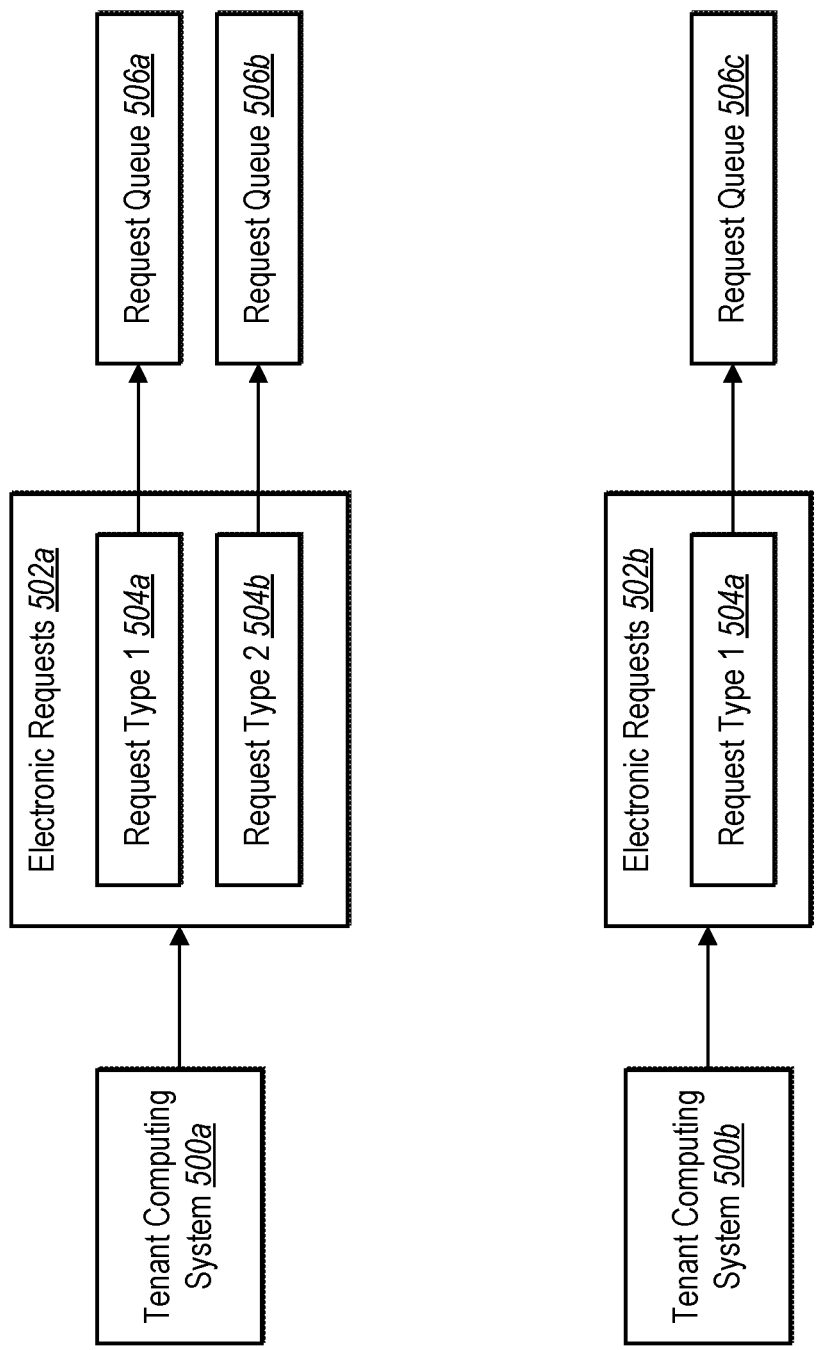
FIG. 5 illustrates an example of the dynamic request queue system dynamically generating request queues for tenant computing systems according to request types in accordance with one or more implementations.

As previously mentioned, the dynamic request queue system 102 can generate different request queues for one or more tenant computing systems according to different request types. For example, FIG. 5 illustrates that the dynamic request queue system 102 generates a plurality of request queues for tenant computing systems based on the request types of electronic requests provided by the tenant computing systems to a shared processing infrastructure. Accordingly, the dynamic request queue system 102 can separate a primary request queue into a number of different request queues based on a plurality of attributes of electronic requests and/or tenant computing systems.

To illustrate, the dynamic request queue system 102 determines that a first tenant computing system 500a and a second tenant computing system 500b provide electronic requests to a shared processing infrastructure. Specifically, the dynamic request queue system 102 determines that the first tenant computing system 500a provides first electronic requests 502a to the shared processing infrastructure. Additionally, the dynamic request queue system 102 determines that the second tenant computing system 500b provides second electronic requests 502b to the shared processing infrastructure.

In one or more embodiments, the dynamic request queue system 102 determines a plurality of request types associated with the electronic requests from the first tenant computing system 500a and the second tenant computing system 500b. For instance, the dynamic request queue system 102 determines that the first electronic requests 502a include requests of a first request type 504a and a second request type 504b. Additionally, the dynamic request queue system 102 determines that the second electronic requests 502b include requests of the first request type 504a.

In response to determining that the first electronic requests 502a include requests of the first request type 504a, the dynamic request queue system 102 generates a first request queue 506a for electronic messages of the first request type 504a from the first tenant computing system 500a. Additionally, the dynamic request queue system 102 generates a second request queue 506b for electronic messages of the second request type 504b from the first tenant computing system 500a. Furthermore, in response to determining that the second electronic requests 502b include requests of the second request type 504b, the dynamic request queue system 102 generates a third request queue 506c for electronic requests of the first request type 504a from the second tenant computing system 500b. Because the second electronic requests 502b include a requests of a single request type (the first request type 504a), the dynamic request queue system 102 generates a single request queue corresponding to the second tenant computing system 500b.

In one or more embodiments, electronic requests include request types corresponding to different topics. To illustrate, as mentioned previously, electronic requests can include messages or instructions associated with various operations including, but not limited to, consent messages associated with digital cookies, data subject access request messages, or other types of electronic requests. For example, the dynamic request queue system 102 can determine that the first tenant computing system 500a issues electronic requests including consent messages and data subject access request messages. The dynamic request queue system 102 can identify the different types of requests (e.g., based on metadata or data included in the requests) and separate the consent messages into the first request queue 506a and the data subject access request messages into the second request queue 506b. Additionally, the dynamic request queue system 102 can determine that the second electronic requests 502b include consent messages.

In one or more alternative embodiments, the dynamic request queue system 102 separates electronic requests of different request types into separate queue spaces. For example, the dynamic request queue system 102 generates a first queue space for requests of the first request type 504a and a second queue space for requests of the second request type 504b. To illustrate, the dynamic request queue system 102 can move electronic requests of the second request type 504b to a separate node of an electronic request processing system. Thus, the dynamic request queue system 102 can separately process electronic requests of different types using different processing infrastructure.

Figure 6:
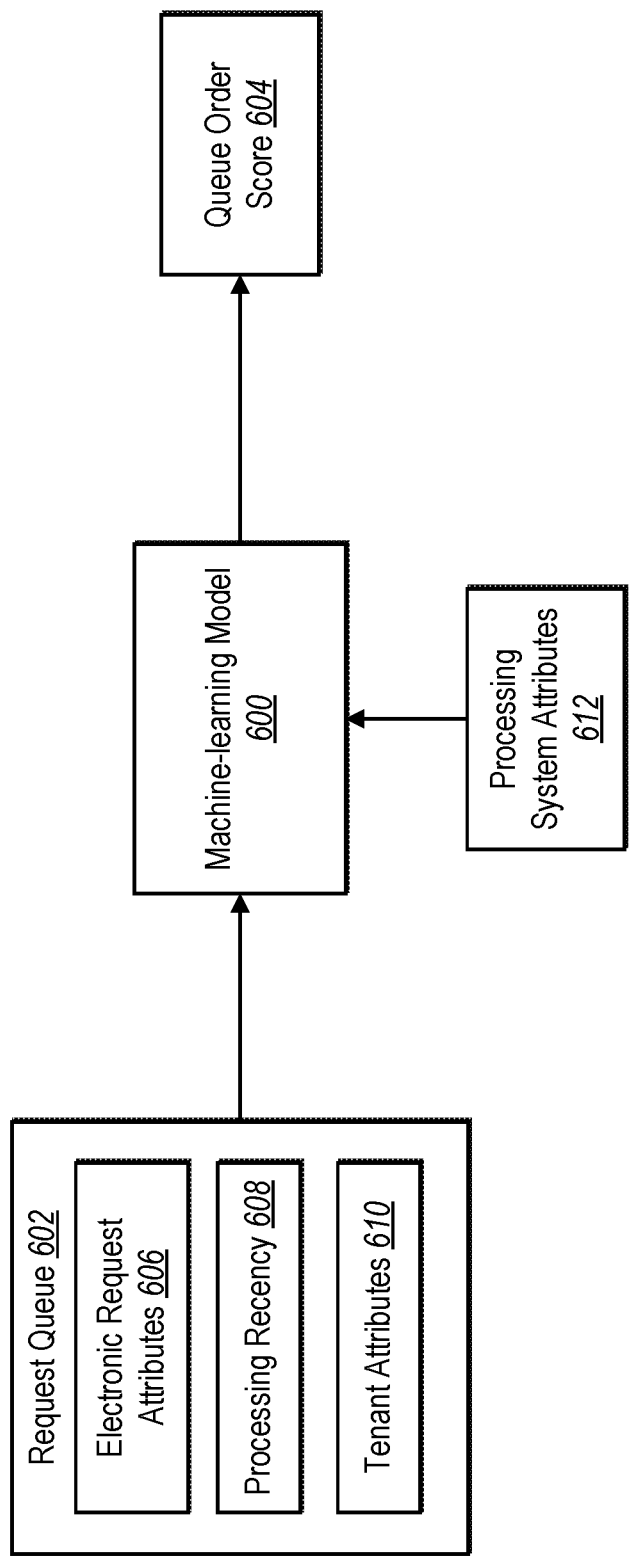
FIG. 6 illustrates an example of the dynamic request queue system utilizing a machine-learning model to generate a queue order score in accordance with one or more implementations.

According to one or more embodiments, the dynamic request queue system 102 utilizes a plurality of attributes of electronic requests to generate queue order scores. In particular, the dynamic request queue system 102 can utilize machine-learning to intelligently generate queue order scores based on extracted features of request queues. For example, FIG. 6 illustrates that the dynamic request queue system 102 utilizes a machine-learning model 600 to extract features of a request queue 602 based on various attributes of the request queue 602. Additionally, the dynamic request queue system 102 teaches utilizing the extracted features to generate a queue order score 604 for the request queue 602.

To illustrate, the dynamic request queue system 102 can utilize the machine-learning model 600 to extract features of the request queue 602 based on electronic request attributes 606, processing recency 608, and tenant attributes 610. For example, the electronic request attributes 606 can include, but is not limited to, a request type, processing requirements (e.g., an estimated processing time), or a number of requests. Additionally, as mentioned, the processing recency 608 can indicate how long ago requests from the request queue 602 were processed. In one or embodiments, the tenant attributes 610 include, but are not limited to, an importance/priority of the tenant computing system associated with the request queue 602, a frequency with which the tenant computing system provides electronic requests to the request queue 602, a historical quantity of requests issued by the tenant computing system, or other historical data associated with the tenant computing system. The dynamic request queue system 102 can use the tenant attributes 610 to determine a weighting or bias associated with a particular tenant computing system.

In one or more embodiments, the dynamic request queue system 102 also provides processing system attributes 612 to the machine-learning model 600 for generating the queue order score 604. To illustrate, the dynamic request queue system 102 can determine processing capabilities associated with the shared processing infrastructure, such as the available processors, memory, or other device capabilities that determine how many electronic requests the shared processing infrastructure can process. For example, the processing capabilities may affect whether the machine-learning model 600 ranks a given request queue higher or lower according to the number of pending requests in the queue.

As mentioned, the dynamic request queue system 102 utilizes the machine-learning model 600 to extract features from the request queue 602 according to the corresponding attributes. Additionally, in some instances, the dynamic request queue system 102 can utilize the machine-learning model 600 to extract features of the shared processing infrastructure based on the processing system attributes 612. The dynamic request queue system 102 can utilize the machine-learning model 600 to generate the queue order score 604 based on the extracted features.

In one or more embodiments, a machine-learning model includes a computer representation that is tuned (e.g., trained) based on inputs to approximate unknown functions. For instance, a machine-learning model includes one or more machine-learning layers, neural network layers, or artificial neurons that approximate unknown functions by analyzing known data at different levels of abstraction. In some embodiments, a machine-learning model includes one or more machine-learning layers or neural network layers including, but not limited to, a k-nearest neighbors model, a support vector machines model, a conditional random field model, a maximum entropy model, a deep learning model, a convolutional neural network, a transformer neural network, a recurrent neural network, a fully-connected neural network, or a combination of a plurality of machine-learning models, neural networks, and/or neural network types. To illustrate, the machine-learning model 600 can include one or more layers to extract features of the request queue 602 based on sequence information of electronic requests in the request queue 602. The machine-learning model 600 can also include one or more layers to extract the processing system attributes 612. The machine-learning model 600 can further include one or more layers to combine the features of the requests and the features of the processing system.

Figure 7:
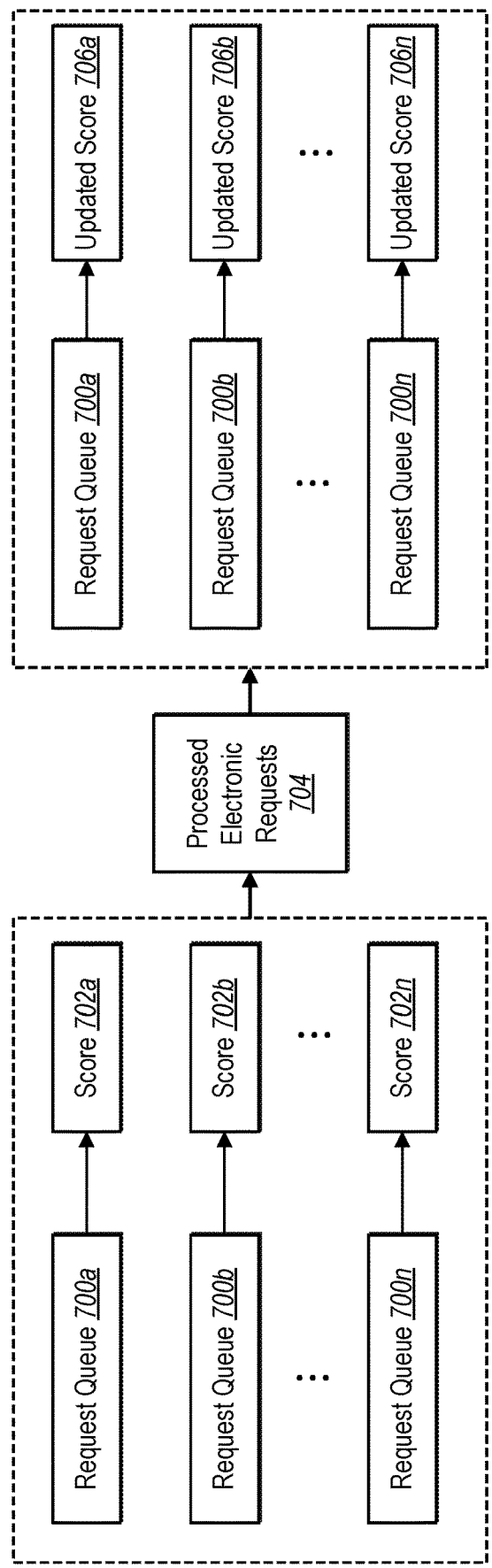
FIG. 7 illustrates an example of illustrates an example of the dynamic request queue system periodically updating scores of request queues in accordance with one or more implementations.

According to one or more embodiments, the dynamic request queue system 102 also periodically generates updated queue order scores for request queues. FIG. 7 illustrates the dynamic request queue system 102 generating updated scores for request queues according to one or more parameters. To illustrate, the dynamic request queue system 102 generates updated scores in response to processing one or more batches of electronic requests. Alternatively, the dynamic request queue system 102 generates updated scores in response to meeting a time threshold.

For example, as illustrated in FIG. 7, the dynamic request queue system 102 can generate request queues 700a-700n associated with a plurality of tenant computing systems. In one or more embodiments, the dynamic request queue system 102 also utilizes a scoring model to generate scores 702a-702n for the plurality of request queues 700a-700n. In response to generating the scores 702a-702n, the dynamic request queue system 102 selects a request queue from which to process electronic requests based on the scores 702a-702n. In one or more embodiments, the dynamic request queue system 102 processes a batch of requests (processed electronic requests 704) from the selected request queue utilizing one or more recipient processors. In alternative embodiments, the dynamic request queue system 102 processes a plurality of batches of requests from one or more selected request queues.

In response to processing the electronic requests, the dynamic request queue system 102 updates the scores associated with the request queues 700a-700n. For example, the dynamic request queue system 102 generates updated scores 706a-706n for the request queues 700a-700n utilizing the scoring model. The dynamic request queue system 102 can update the processing priority of the request queues 700a-700n based on the updated scores 706a-706n. To illustrate, the dynamic request queue system 102 can modify the processing priority to reduce the priority of the selected request queue based on an increased score after recently processing electronic requests from the selected queue.

In one or more embodiments, the dynamic request queue system 102 updates the scores for request queues in response to other events. For example, the dynamic request queue system 102 can update scores for request queues in response to determining that a threshold amount of time has passed. To illustrate, the dynamic request queue system 102 can repeatedly and periodically update the scores for request queues. In alternative embodiments, the dynamic request queue system 102 updates the scores in response to generating a new request queue.

Figure 8:
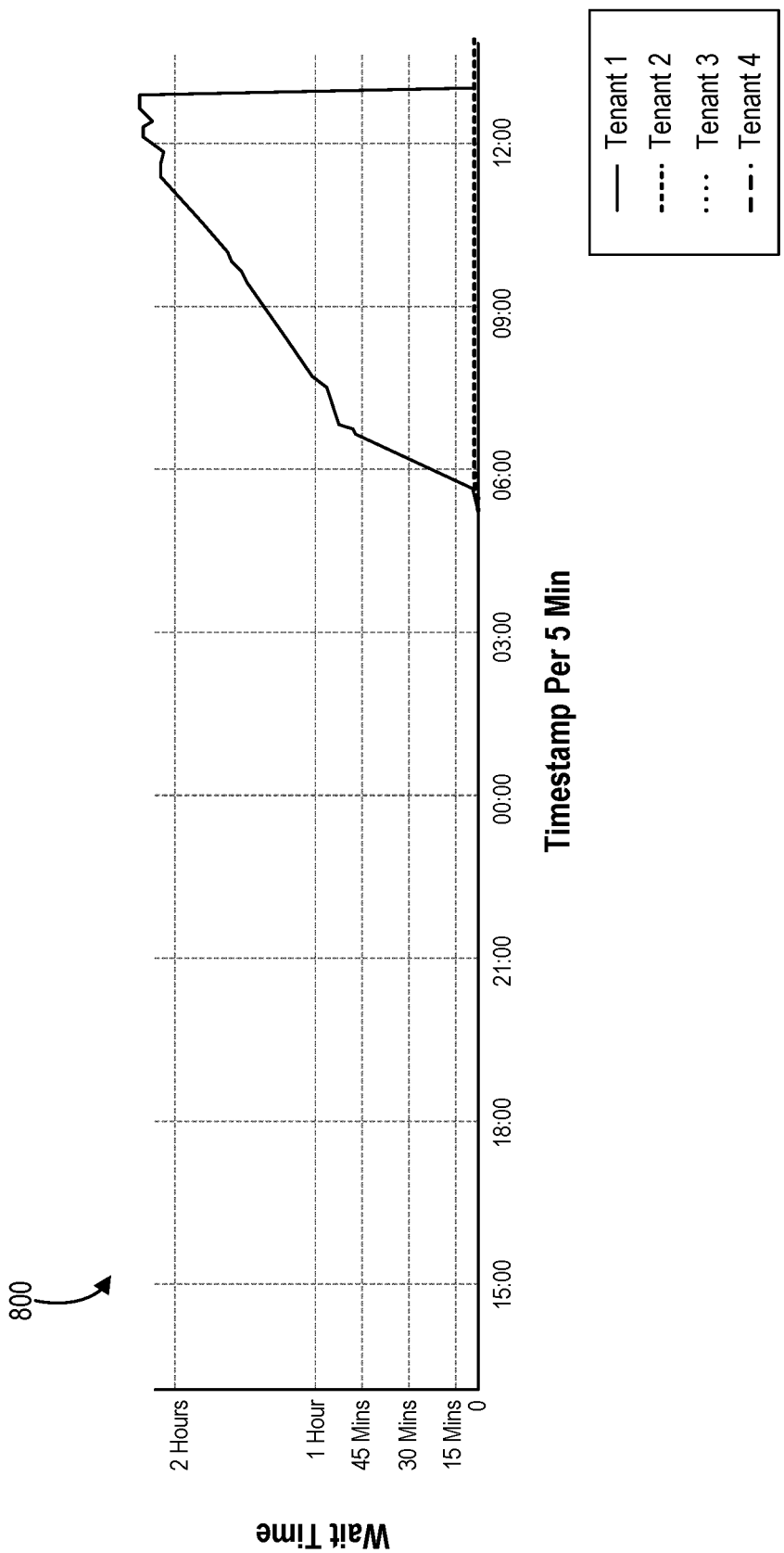
FIG. 8 illustrates an example graph diagram including processing wait times of a plurality of electronic requests in request queues of a plurality of tenant computing systems in accordance with one or more implementations.

By utilizing separate request queues for processing electronic requests via a shared processing infrastructure, the dynamic request queue system 102 can improve the efficiency of the shared processing infrastructure. FIG. 8 illustrates a graph diagram 800 of measured data of an implementation of the dynamic request queue system 102 that indicates a wait time associated with processing electronic requests from a plurality of request queues. In particular, FIG. 8 illustrates that a first tenant computing system ("Tenant 1") has issued a large number of electronic requests, resulting in long wait times for the electronic requests associated with the first tenant computing system. Additionally, FIG. 8 illustrates that the other tenant computing systems do not experience significant wait times for respective electronic requests (as shown by the relatively flat lines), despite the longer processing wait times of the first tenant computing system.

Figure 9:
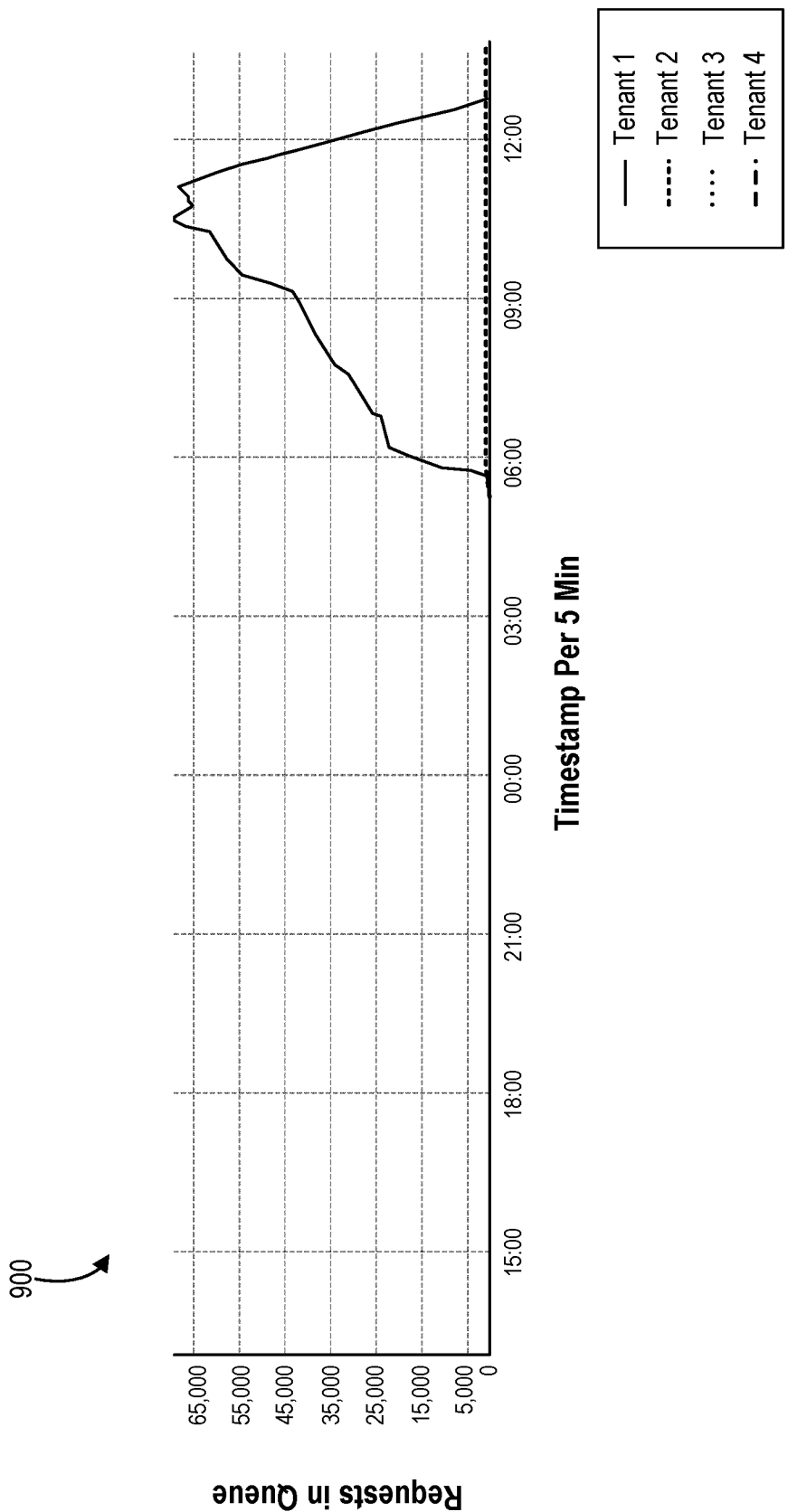
FIG. 9 illustrates an example graph diagram including request quantities in request queues of a plurality of tenant computing systems over time in accordance with one or more implementations.

FIG. 9 illustrates a graph diagram 900 indicating a number of requests in the plurality of request queues of FIG. 8. Specifically, FIG. 9 illustrates that the first tenant computing system has issued tens of thousands of electronic requests to the shared processing system, while the other tenant computing systems have issued relatively few electronic requests. Even though the first tenant computing system has issued tens of thousands of electronic requests, the dynamic request queue system 102 can process the electronic requests issued by the other tenant processing systems intermittently while processing the tens of thousands of electronic requests. Accordingly, as indicated by FIG. 8 and FIG. 9, the dynamic request queue system 102 can improve the efficiency of the shared processing infrastructure by alternately processing electronic requests in separate requests queues based on a determine priority.

Figure 10:
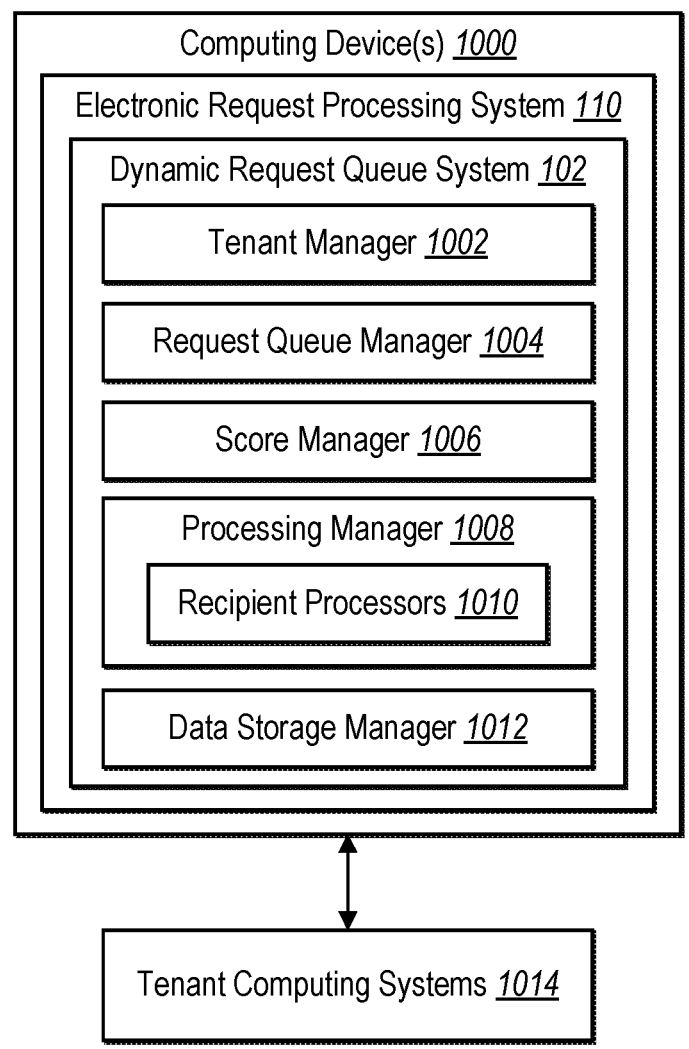
FIG. 10 illustrates an example computing device including the dynamic request queue system of FIG. 1 in accordance with one or more implementations.

FIG. 10 illustrates a detailed schematic diagram of an embodiment of the dynamic request queue system 102 described above. As shown, the dynamic request queue system 102 is implemented in an electronic request processing system 110 on computing device(s) 1000 (e.g., a client device and/or server device as described in FIG. 1, and as further described below in relation to FIG. 12). Additionally, the dynamic request queue system 102 includes, but is not limited to, a tenant manager 1002, a request queue manager 1004, a score manager 1006, a processing manager 1008 including recipient processors 1010, and a data storage manager 1012. The dynamic request queue system 102 can be implemented on any number of computing devices. For example, the dynamic request queue system 102 can be implemented in a distributed system of server devices for processing electronic requests. The dynamic request queue system 102 can also be implemented within one or more additional systems. Alternatively, the dynamic request queue system 102 can be implemented on a single computing device such as a single server device. Additionally, as illustrated, the computing device(s) 1000 are in communication with tenant computing systems 1014.

In one or more embodiments, each of the components of the dynamic request queue system 102 is in communication with other components using any suitable communication technologies. Additionally, the components of the dynamic request queue system 102 are capable of being in communication with one or more other devices including tenant computing systems, server devices (e.g., cloud storage devices), licensing servers, or other devices/systems. It will be recognized that although the components of the dynamic request queue system 102 are shown to be separate in FIG. 10, any of the subcomponents may be combined into fewer components, such as into a single component, or divided into more components as may serve a particular implementation. Furthermore, although the components of FIG. 10 are described in connection with the dynamic request queue system 102, at least some of the components for performing operations in conjunction with the dynamic request queue system 102 described herein may be implemented on other devices within the environment.

In some embodiments, the components of the dynamic request queue system 102 include software, hardware, or both. For example, the components of the dynamic request queue system 102 include one or more instructions stored on a computer-readable storage medium and executable by processors of one or more computing devices (e.g., the computing device(s) 1000). When executed by the one or more processors, the computer-executable instructions of the dynamic request queue system 102 cause the computing device(s) 1000 to perform the operations described herein. Alternatively, the components of the dynamic request queue system 102 can include hardware, such as a special purpose processing device to perform a certain function or group of functions. Additionally, or alternatively, the components of the dynamic request queue system 102 can include a combination of computer-executable instructions and hardware.

Furthermore, the components of the dynamic request queue system 102 performing the functions described herein with respect to the dynamic request queue system 102 may, for example, be implemented as part of a stand-alone application, as a module of an application, as a plug-in for applications, as a library function or functions that may be called by other applications, and/or as a cloud-computing model. Thus, the components of the dynamic request queue system 102 may be implemented as part of a stand-alone application on a computing device or a server device. Alternatively, or additionally, the components of the dynamic request queue system 102 may be implemented in any application that provides or utilizes a shared process infrastructure.

The dynamic request queue system 102 includes a tenant manager 1002 that manages tenant computing systems 1014 that contribute to a shared processing infrastructure. For example, the tenant manager 1002 identifies the tenant computing systems 1014 that issue electronic requests to a shared processing infrastructure via a primary request queue. Additionally, in some embodiments, the tenant manager 1002 generates server-side entities corresponding to the tenant computing systems based on information in the electronic requests or based on identifying data from the tenant computing systems 1014.

The dynamic request queue system 102 also includes a request queue manager 1004 to manage request queues for the tenant computing systems 1014. In one or more embodiments, the request queue manager 1004 dynamically generates request queues for the tenant computing systems 1014. Additionally, the request queue manager 1004 can add or remove request queues on-demand based on electronic requests provided to a shared processing infrastructure from the tenant computing systems 1014.

The dynamic request queue system 102 further includes a score manager 1006 to generate queue order scores for request queues. For instance, the score manager 1006 includes a scoring model that generates scores indicating a processing priority for the request queues. The score manager 1006 can generate the scores based on processing recency and a number of requests in each request queue. In some embodiments, the score manager 1006 includes a machine-learning model to generate scores for request queues based on features of the request queues.

Additionally, the dynamic request queue system 102 includes a processing manager 1008 to process electronic requests via the shared processing infrastructure. To illustrate, the processing manager 1008 utilizes the recipient processors 1010 to process electronic requests via a plurality of request queues. Specifically, the processing manager 1008 selects a request queue based on scores generated by the score manager 1006. The processing manager 1008 also utilizes one or more of the recipient processors 1010 to process a batch of electronic requests from the selected request queue.

The dynamic request queue system 102 also includes a data storage manager 1012 (that comprises a non-transitory computer memory/one or more memory devices) that stores and maintains data associated with processing electronic requests via a shared processing infrastructure. For example, the data storage manager 1012 stores data associated with the tenant computing systems 1014, request queues, and electronic requests. To illustrate, the data storage manager 1012 stores one or more machine-learning models for generating queue orders scores, request queues, queue order scores, and/or processing data associated with the request queues and electronic requests in the request queues.

Figure 11:
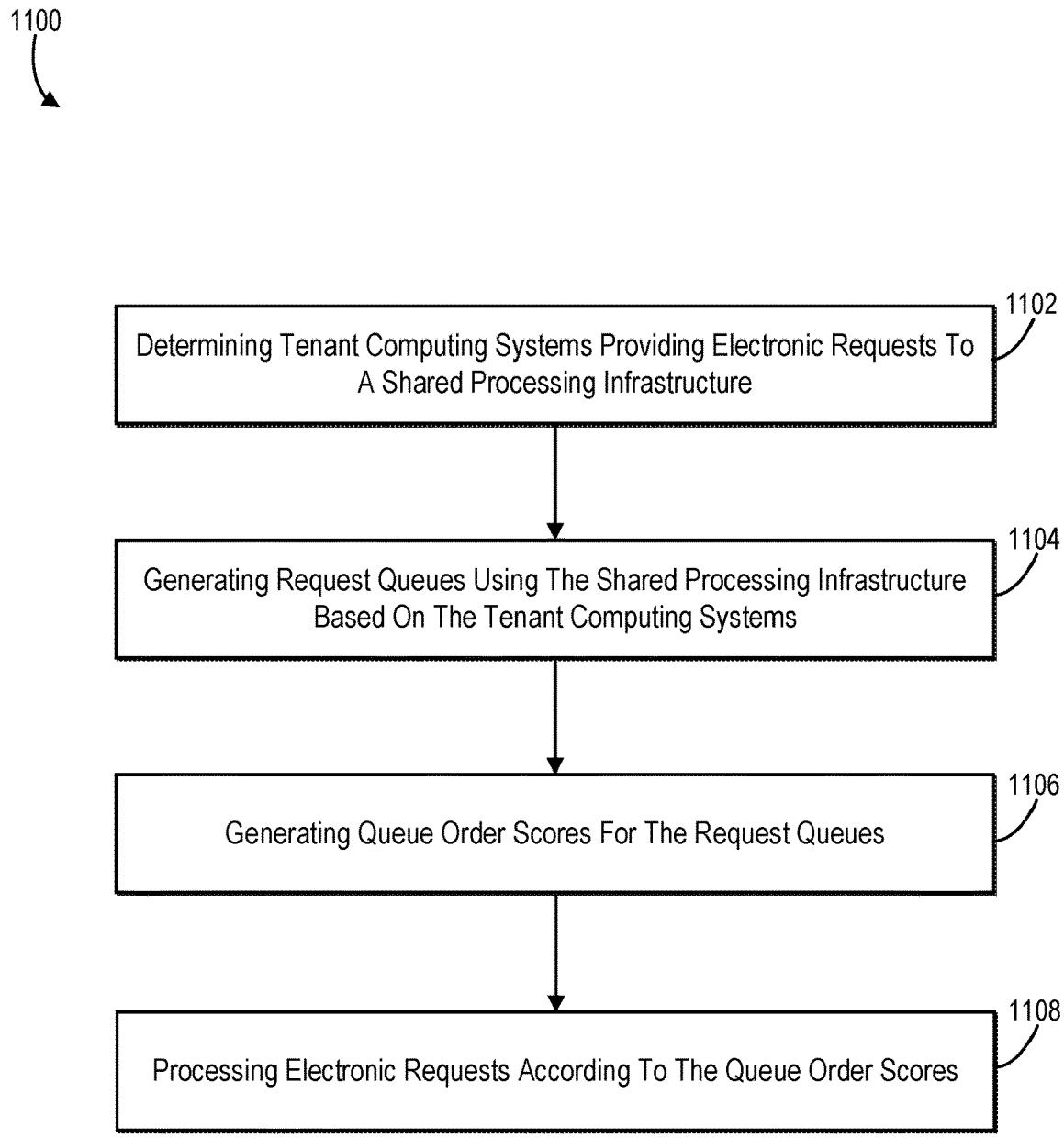
FIG. 11 illustrates an example flowchart of a series of acts for dynamically generating request queues for processing electronic requests from a plurality of tenant computing systems in a shared processing infrastructure in accordance with one or more implementations.

Turning now to FIG. 11, this figure shows a flowchart of a series of acts 1100 of generating action recommendations for modifying physical emissions sources based on forecasted emissions usage utilizing a plurality of forecasting machine-learning models. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

As shown, the series of acts 1100 includes an act 1102 of determining tenant computing systems providing electronic requests to a shared processing infrastructure. For example, act 1102 involves determining a plurality of tenant computing systems that provide electronic requests to an electronic request processing system via a shared processing infrastructure. For example, act 1102 can involve determining a plurality of tenant computing systems that provide electronic requests to an electronic request processing system via a shared processing infrastructure comprising one or more servers. Act 1102 can involve determining tenant computing systems that have previously provided requests to the electronic request processing system via the shared processing infrastructure during a predetermined time period. In one or more embodiments, the dynamic request queue system 102 performs act 1102, as described above with respect to FIGS. 2 and 3A.

The series of acts 1100 also includes an act 1104 of generating request queues using the shared processing infrastructure based on the tenant computing systems. For example, act 1104 involves generating a plurality of request queues corresponding to the shared processing infrastructure by separating a primary request queue of the shared processing infrastructure into the plurality of request queues based on the plurality of tenant computing systems. In one or more embodiments, the dynamic request queue system 102 performs act 1104, as described above with respect to FIGS. 2 and 3B.

Act 1104 can involve dynamically generating a first request queue corresponding to a first tenant computing system in response to determining that the first tenant computing system previously provided one or more electronic requests to the electronic request processing system via the shared processing infrastructure. Act 1104 can also involve dynamically generating a second request queue corresponding to a second tenant computing system in response to determining that the second tenant computing system previously provided one or more electronic requests to the electronic request processing system via the shared processing infrastructure.

Act 1104 can further involve moving one or more pending electronic requests corresponding to the first tenant computing system into the first request queue. Act 1104 can also involve moving one or more pending electronic requests corresponding to the second tenant computing system into the second request queue.

Act 1104 can involve determining a plurality of request types associated with the plurality of tenant computing systems. Act 1104 can also involve separating the primary request queue into the plurality of request queues based on the plurality of tenant computing systems and the plurality of request types.

Act 1104 can involve dynamically generating a first set of request queues for the plurality of tenant computing systems for a first time period. Act 1104 can also involve dynamically generating a second set of request queues by adding one or more request queues to the first set of request queues for the plurality of tenant computing systems for a second time period.

Additionally, the series of acts 1100 includes an act 1106 of generating queue order scores for the request queues. For example, act 1106 involves generating queue order scores for the plurality of request queues based in part on a processing recency of the plurality of request queues. Act 1106 can involve determining that one or more request queues of the plurality of request queues comprise pending electronic requests. Act 1106 can also involve generating one or more queue order scores for the one or more request queues based on the plurality of request queues comprise pending electronic requests. Act 1106 can involve generating queue order scores for the plurality of request queues based on a processing recency of the plurality of request queues and a number of electronic requests in each request queue of the plurality of request queues. In one or more embodiments, the dynamic request queue system 102 performs act 1106, as described above with respect to FIGS. 2 and 3B.

Act 1106 can also involve determining that a request queue of the plurality of request queues does not comprise a pending electronic request. Act 1106 can further involve generating a queue order score for the request queue above a score threshold in response to the request queue being empty.

Act 1106 can involve determining a plurality of queue attributes associated with the plurality of request queues, the plurality of queue attributes comprising the processing recency of the plurality of request queues. Act 1106 can further involve generating the queue order scores based on features extracted from the plurality of queue attributes utilizing a machine-learning model.

The series of acts 1100 further includes an act 1108 of processing electronic requests according to the queue order scores. For example, act 1108 involves processing a plurality of electronic requests in the plurality of request queues according to the queue order scores. Act 1108 can also involve selecting a request queue of the plurality of queues in response to determining that the request queue comprises a lowest request order. Act 1108 can involve processing a batch of electronic requests in the request queue by providing the batch of electronic requests to a recipient processor associated with the shared processing infrastructure. In one or more embodiments, the dynamic request queue system 102 performs act 1108, as described above with respect to FIGS. 2 and 3B.

Act 1108 can involve processing a batch of electronic requests from the selected request queue utilizing the one or more recipient processors. Act 1108 can involve selecting an additional request queue of the plurality of request queues based on the queue order scores. Act 1108 can further involve processing an additional batch of electronic requests from the selected additional request queue utilizing the one or more recipient processors.

As part of act 1108, or as an additional act, the series of acts 1100 can include selecting request queue of the plurality of request queues based on the queue order scores. For example, the series of acts 1100 can include selecting a request queue comprising a lowest queue order score.

The series of acts 1100 can also include generating, after processing a subset of the plurality of electronic requests, updated queue order scores for the plurality of request queues. For example, the series of acts 1100 can include generating updated queue order scores for the plurality of request queues after meeting a time threshold. The series of acts 1100 can include processing additional electronic requests in the plurality of electronic requests based on the updated queue order scores.

In one or more embodiments, the series of acts 1100 includes detecting an additional tenant computing system that provides one or more electronic requests to the electronic request processing system via the shared processing infrastructure including one or more servers. For example, the series of acts 1100 can include determining an additional tenant computing system corresponding to an electronic request provided to the electronic request processing system in the primary request queue of the shared processing infrastructure. The series of acts 1100 can also include dynamically generating an additional request queue corresponding to the shared processing infrastructure for the additional tenant computing system. For example, the series of acts 1100 can include moving the electronic request of the additional tenant computing system from the primary request queue to the additional request queue.

Additionally, the series of acts 1100 can include generating an additional queue order score for the additional request queue based in part on a processing recency of the additional request queue. The series of acts 1100 can also include processing the one or more electronic requests from the additional tenant computing in an order based on the additional queue order score. The series of acts 1100 can include ranking the plurality of request queues and the additional request queue based on the queue order scores of the plurality of request queues and the additional queue order score of the additional request queue.

The series of acts 1100 can also include generating updated queue order scores for the plurality of request queues and the additional request queue. The series of acts 1100 can further include processing the plurality of electronic requests of the plurality of request queues and the electronic request of the additional request queue according to the updated queue order scores.

The series of acts 1100 can include generating periodically updated queue order scores for the plurality of request queues for a plurality of time periods. The series of acts 1100 can also include processing electronic requests in the plurality of request queues according to the periodically updated queue order scores for the plurality of time periods.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
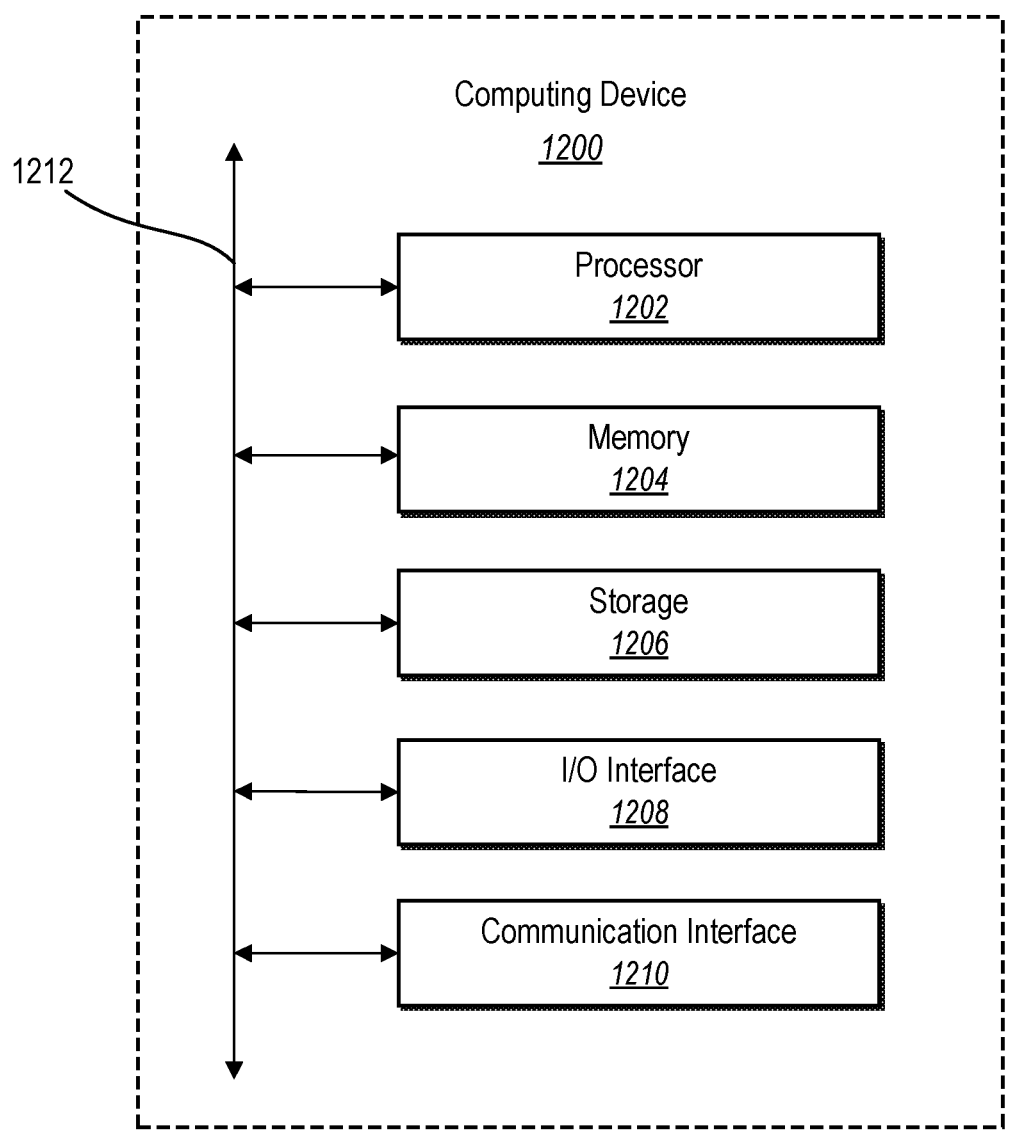
FIG. 12 illustrates an example of a computing device in accordance with one or more implementations.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining, by at least one processor, a plurality of tenant computing systems that provide electronic requests to an electronic request processing system via a primary request queue of a shared processing infrastructure, the primary request queue comprising a plurality of electronic requests received from the plurality of tenant computing systems for processing via the shared processing infrastructure;
   generating, by the at least one processor, a plurality of request queues corresponding to the shared processing infrastructure by separating the primary request queue of the shared processing infrastructure into the plurality of request queues based on the plurality of tenant computing systems by:
      generating a request queue corresponding to a tenant computing system in response to determining that the tenant computing system previously provided a set of electronic requests to the electronic request processing system via the shared processing infrastructure according to a pseudo-identity corresponding to the tenant computing system based on the set of electronic requests; and
      moving one or more pending requests of the set of electronic requests corresponding to the tenant computing system into the request queue;
   generating, by the at least one processor, queue order scores for the plurality of request queues based in part on a processing recency of the plurality of request queues; and
   processing a plurality of electronic requests in the plurality of request queues according to the queue order scores.

2. The computer-implemented method of claim 1, further comprising:
   generating, after processing a subset of the plurality of electronic requests, updated queue order scores for the plurality of request queues; and
   processing additional electronic requests of the plurality of electronic requests based on the updated queue order scores.

3. The computer-implemented method of claim 1, wherein determining the plurality of tenant computing systems comprises determining tenant computing systems that have previously provided requests to the electronic request processing system via the shared processing infrastructure during a predetermined time period.

4. The computer-implemented method of claim 1, further comprising:
   detecting an additional tenant computing system that provides one or more electronic requests to the electronic request processing system via the shared processing infrastructure; and
   generating an additional request queue corresponding to the shared processing infrastructure for the additional tenant computing system.

5. The computer-implemented method of claim 4, further comprising:
   generating an additional queue order score for the additional request queue based in part on a processing recency of the additional request queue; and
   processing the one or more electronic requests from the additional tenant computing system in an order based on the additional queue order score.

6. The computer-implemented method of claim 1, wherein generating the queue order scores comprises:
   determining that one or more request queues of the plurality of request queues comprise pending electronic requests; and
   generating one or more queue order scores for the one or more request queues based on the plurality of request queues comprise pending electronic requests.

7. The computer-implemented method of claim 1, wherein generating the queue order scores comprises:
   determining that a request queue of the plurality of request queues does not comprise a pending electronic request; and
   generating a queue order score for the request queue above a score threshold in response to the request queue being empty.

8. The computer-implemented method of claim 1, wherein generating the plurality of request queues comprises:
   generating a first request queue corresponding to a first tenant computing system in response to determining that the first tenant computing system previously provided a first set of electronic requests to the electronic request processing system via the shared processing infrastructure according to a first pseudo-identity corresponding to the first tenant computing system based on the first set of electronic requests;
   generating a second request queue corresponding to a second tenant computing system in response to determining that the second tenant computing system previously provided a second set of electronic requests to the electronic request processing system via the shared processing infrastructure according to a second pseudo-identity corresponding to the second tenant computing system based on the second set of electronic requests;
   moving one or more pending electronic requests of the first set of electronic requests corresponding to the first tenant computing system into the first request queue; and
   moving one or more pending electronic requests of the second set of electronic requests corresponding to the second tenant computing system into the second request queue.

9. The computer-implemented method of claim 1, wherein processing the plurality of electronic requests comprises:

selecting a request queue of the plurality of request queues in response to determining that the request queue comprises a lowest queue order score; and processing a batch of electronic requests in the request queue by providing the batch of electronic requests to a recipient processor associated with the shared processing infrastructure.

10. The computer-implemented method of claim 1, wherein generating the plurality of request queues comprises:

determining a plurality of request types associated with the plurality of tenant computing systems; and separating the primary request queue into the plurality of request queues based on the plurality of tenant computing systems and the plurality of request types by separating a plurality of requests from a determined tenant computing system into a plurality of separate request queues assigned to the determined tenant computing system according to the plurality of request types.

11. A system comprising:

one or more processors configured to cause the system to:

determine a plurality of tenant computing systems that provide electronic requests to an electronic request processing system via a primary request queue of a shared processing infrastructure, the primary request queue comprising a plurality of electronic requests received from the plurality of tenant computing systems for processing via the shared processing infrastructure;

generate a plurality of request queues corresponding to the shared processing infrastructure by separating the primary request queue of the shared processing infrastructure into the plurality of request queues based on the plurality of tenant computing systems by:

generating a request queue corresponding to a tenant computing system in response to determining that the tenant computing system previously provided a set of electronic requests to the electronic request processing system via the shared processing infrastructure according to a pseudo-identity corresponding to the tenant computing system based on the set of electronic requests; and moving one or more pending requests of the set of electronic requests corresponding to the tenant computing system into the request queue;

generate queue order scores for the plurality of request queues based in part on a processing recency of the plurality of request queues;

select a request queue of the plurality of request queues based on the queue order scores; and process one or more electronic requests in the selected request queue via one or more recipient processors.

12. The system of claim 11, wherein the one or more processors are further configured to:

generate updated queue order scores for the plurality of request queues after meeting a time threshold; and process additional electronic requests in the plurality of request queues according to the queue order scores.

13. The system of claim 11, wherein the one or more processors are further configured to:

determine an additional tenant computing system corresponding to an electronic request provided to the electronic request processing system in the primary request queue of the shared processing infrastructure in response to determining an additional pseudo-tenant identity corresponding to the additional tenant computing system based on a request identifier of the electronic request;

generate an additional request queue corresponding to the shared processing infrastructure for the additional tenant computing system; and move the electronic request of the additional tenant computing system from the primary request queue to the additional request queue.

14. The system of claim 13, wherein the one or more processors are further configured to:

generate updated queue order scores for the plurality of request queues and the additional request queue; and process the one or more electronic requests of the plurality of request queues and the electronic request of the additional request queue according to the updated queue order scores.

15. The system of claim 11, wherein the one or more processors are further configured to generate the queue order scores by:

determining a plurality of queue attributes associated with the plurality of request queues, the plurality of queue attributes comprising the processing recency of the plurality of request queues and numbers of electronic requests in the plurality of request queues; and generating the queue order scores based on features extracted from the plurality of queue attributes utilizing a machine-learning model.

16. The system of claim 11, wherein the one or more processors are further configured to process the one or more electronic requests by:

processing a batch of electronic requests from the selected request queue utilizing the one or more recipient processors;

selecting an additional request queue of the plurality of request queues based on the queue order scores; and processing an additional batch of electronic requests from the selected additional request queue utilizing the one or more recipient processors.

17. The system of claim 11, wherein the one or more processors are further configured to generate the plurality of request queues comprises:

generating a first set of request queues for the plurality of tenant computing systems for a first time period; and generating a second set of request queues by adding one or more request queues to the first set of request queues for the plurality of tenant computing systems for a second time period.

18. A non-transitory computer readable medium storing instructions thereon that, when executed by at least one processor, cause a computing device to perform operations comprising:

determining a plurality of tenant computing systems that provide electronic requests to an electronic request processing system via a primary request queue of a shared processing infrastructure comprising one or more servers, the primary request queue comprising a plurality of electronic requests received from the plurality of tenant computing systems for processing via the shared processing infrastructure;

generating a plurality of request queues corresponding to the shared processing infrastructure by separating the primary request queue of the shared processing infrastructure into the plurality of request queues based on the plurality of tenant computing systems by:

generating a request queue corresponding to a tenant computing system in response to determining that the tenant computing system previously provided a set of electronic requests to the electronic request processing system via the shared processing infrastructure according to a pseudo-identity corresponding to the tenant computing system based on the set of electronic requests; and moving one or more pending requests of the set of electronic requests corresponding to the tenant computing system into the request queue;

generating queue order scores for the plurality of request queues based on a processing recency of the plurality of request queues and a number of electronic requests in each request queue of the plurality of request queues;

selecting a request queue of the plurality of request queues based on the queue order scores; and processing a batch of electronic requests in the selected request queue via a recipient processor.

19. The non-transitory computer readable medium of claim 18, further comprising:

determining an additional tenant computing system that provides electronic requests to the electronic request processing system via the shared processing infrastructure comprising the one or more servers;

generating, for the additional tenant computing system, an additional request queue corresponding to the shared processing infrastructure;

generating an additional queue order score for the additional request queue based on a processing recency of the additional request queue; and ranking the plurality of request queues and the additional request queue based on the queue order scores of the plurality of request queues and the additional queue order score of the additional request queue.

20. The non-transitory computer readable medium of claim 18, further comprising:

generating periodically updated queue order scores for the plurality of request queues for a plurality of time periods; and processing electronic requests in the plurality of request queues according to the periodically updated queue order scores for the plurality of time periods.

* * * * *